United States Patent
Rijskamp et al.

(10) Patent No.: US 10,966,564 B2
(45) Date of Patent: Apr. 6, 2021

(54) SYSTEM FOR PREPARING A QUANTITY OF BEVERAGE SUITABLE FOR CONSUMPTION

(71) Applicant: KONINKLIJKE DOUWE EGBERTS B.V., Utrecht (NL)

(72) Inventors: Peter Rijskamp, Gaggio Montano (IT); Judith Margreet Hanneke Ogink, Putten (NL); Jarno Beekman, Drachten (NL); Gerbrand Kristiaan De Graaff, Hillegom (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 164 days.

(21) Appl. No.: 16/261,469

(22) Filed: Jan. 29, 2019

(65) Prior Publication Data
US 2019/0343324 A1    Nov. 14, 2019

Related U.S. Application Data

(63) Continuation of application No. PCT/NL2017/050521, filed on Aug. 3, 2017.

(30) Foreign Application Priority Data

Aug. 3, 2016 (NL) .................................. 2017277
Aug. 3, 2016 (NL) .................................. 2017278
(Continued)

(51) Int. Cl.
*A47J 31/36* (2006.01)
*A47J 31/40* (2006.01)
(Continued)

(52) U.S. Cl.
CPC ............... *A47J 31/407* (2013.01); *A23F 5/26* (2013.01); *A47J 31/0647* (2013.01);
(Continued)

(58) Field of Classification Search
CPC ................ A47J 31/3628; A47J 31/3623; A47J 31/3633; A47J 31/3695
(Continued)

(56) References Cited

U.S. PATENT DOCUMENTS 4,775,048 A    10/1988  Baecchi
4,787,299 A    11/1988  Levi
(Continued)

FOREIGN PATENT DOCUMENTS

AU    2013305155    3/2015
CA    2765324    11/2010
(Continued)

OTHER PUBLICATIONS

International Preliminary Report on Patentability, PCT/NL2017/050509, 7 pages (dated Feb. 5, 2019).
(Continued)

*Primary Examiner* — Reginald Alexander
(74) *Attorney, Agent, or Firm* — Fitch, Even, Tabin & Flannery LLP

(57) ABSTRACT

A system for preparing a quantity of beverage suitable for consumption, including an apparatus including a first brew chamber part having a cavity bounded by a chamber inner wall and a chamber bottom of the first brew chamber part wherein the cavity is arranged for selectively holding one of a first and second exchangeable capsules, wherein the first brew chamber part is further provided with an alignment cap which is movable in an axial direction of the first brew chamber part.

20 Claims, 17 Drawing Sheets

(30) Foreign Application Priority Data

| Aug. 3, 2016 | (NL) | 2017279 |
| Aug. 3, 2016 | (NL) | 2017280 |
| Aug. 3, 2016 | (NL) | 2017281 |
| Aug. 3, 2016 | (NL) | 2017282 |
| Aug. 3, 2016 | (NL) | 2017283 |
| Aug. 3, 2016 | (NL) | 2017284 |
| Aug. 3, 2016 | (NL) | 2017285 |
| Aug. 3, 2016 | (NL) | 2017286 |
| Jul. 10, 2017 | (NL) | 2019216 |
| Jul. 10, 2017 | (NL) | 2019218 |

(51) Int. Cl.
*A47J 31/06* (2006.01)
*A47J 31/44* (2006.01)
*A47J 31/46* (2006.01)
*A23F 5/26* (2006.01)
*A47J 31/52* (2006.01)
*B65D 85/804* (2006.01)

(52) U.S. Cl.
CPC ....... *A47J 31/3623* (2013.01); *A47J 31/3628* (2013.01); *A47J 31/3633* (2013.01); *A47J 31/3638* (2013.01); *A47J 31/3695* (2013.01); *A47J 31/4403* (2013.01); *A47J 31/468* (2018.08); *A47J 31/52* (2013.01); *B65D 85/8043* (2013.01)

(58) Field of Classification Search
USPC .................................. 99/295, 302 P
See application file for complete search history.

(56) References Cited

U.S. PATENT DOCUMENTS

| 5,197,374 | A | 3/1993 | Fond |
| 5,964,142 | A | 10/1999 | Tio |
| 6,026,732 | A | 2/2000 | Kollep |
| 7,337,704 | B2 | 3/2008 | Hammad |
| 7,607,385 | B2 | 10/2009 | Halliday |
| 8,210,096 | B2 | 7/2012 | Fin |
| 8,836,956 | B2 | 9/2014 | Jarisch |
| 9,167,934 | B2 | 10/2015 | Höglauer |
| 9,986,869 | B2 | 6/2018 | Bonacci |
| 2001/0011502 | A1 | 8/2001 | Bonanno |
| 2002/0023543 | A1* | 2/2002 | Schmed .............. A47J 31/3628 99/295 |
| 2003/0066431 | A1 | 4/2003 | Fanzutti |
| 2004/0197444 | A1 | 10/2004 | Halliday |
| 2005/0223904 | A1 | 10/2005 | Laigneau |
| 2006/0107841 | A1* | 5/2006 | Schifferle .............. A47J 31/0668 99/279 |
| 2006/0266224 | A1 | 11/2006 | Hammad |
| 2008/0006159 | A1 | 1/2008 | Fischer |
| 2010/0064899 | A1* | 3/2010 | Aardenburg ....... B65D 85/8043 99/295 |
| 2011/0000377 | A1 | 1/2011 | Favre |
| 2011/0142996 | A1 | 6/2011 | Krueger |
| 2011/0185910 | A1 | 8/2011 | Ryser |
| 2012/0240779 | A1 | 9/2012 | Perentes |
| 2013/0099597 | A1 | 4/2013 | Perentes |
| 2013/0220138 | A1 | 8/2013 | Deuber |
| 2013/0323366 | A1 | 12/2013 | Gerbaulet |
| 2014/0053734 | A1 | 2/2014 | Santi |
| 2014/0227414 | A1 | 8/2014 | Perentes |
| 2014/0263780 | A1 | 9/2014 | Day, Jr. |
| 2014/0290495 | A1 | 10/2014 | Perentes |
| 2015/0027375 | A1 | 1/2015 | Cha |
| 2015/0059587 | A1 | 3/2015 | Colleoni |
| 2015/0082989 | A1 | 3/2015 | Besson |
| 2015/0147448 | A1 | 5/2015 | Lo Foro |
| 2015/0157169 | A1 | 6/2015 | Krüger |
| 2015/0158665 | A1 | 6/2015 | Krüger |
| 2015/0183577 | A1 | 7/2015 | Talon |
| 2015/0225169 | A1 | 8/2015 | Jarisch |
| 2015/0238039 | A1 | 8/2015 | Fischer |
| 2015/0272375 | A1 | 10/2015 | Flick et al. |
| 2015/0272376 | A1 | 10/2015 | Flick |
| 2015/0272380 | A1 | 10/2015 | Flick |
| 2015/0342394 | A1 | 12/2015 | Bonacci et al. |
| 2016/0150907 | A1 | 6/2016 | Bolognese et al. |

FOREIGN PATENT DOCUMENTS

| CN | 1232212 | 10/1999 |
| CN | 1612831 | 5/2005 |
| CN | 101123905 | 2/2008 |
| CN | 101389551 | 3/2009 |
| CN | 100480150 | 4/2009 |
| CN | 201481108 | 5/2010 |
| CN | 101795605 | 8/2010 |
| CN | 102188161 | 9/2011 |
| CN | 102245065 | 11/2011 |
| CN | 103002781 | 3/2013 |
| CN | 103124509 | 5/2013 |
| CN | 202960135 | 6/2013 |
| CN | 103829804 A | 6/2014 |
| CN | 104244780 | 12/2014 |
| CN | 104884368 | 9/2015 |
| CN | 105431358 | 3/2016 |
| CN | 105813958 | 7/2016 |
| DE | 10334526 | 2/2005 |
| DE | 202007002910 | 5/2007 |
| DE | 102005049624 | 7/2007 |
| DE | 202012005191 | 6/2012 |
| DE | 102012010394 | 11/2013 |
| DE | 202015100812 | 5/2016 |
| DE | 202015100813 | 5/2016 |
| DE | 202015100814 | 5/2016 |
| DE | 202015101266 | 6/2016 |
| EP | 0449533 | 10/1991 |
| EP | 0451980 | 10/1991 |
| EP | 1183975 | 3/2002 |
| EP | 1 208 782 A1 | 5/2002 |
| EP | 1360919 | 11/2003 |
| EP | 1518484 | 3/2005 |
| EP | 1555219 | 7/2005 |
| EP | 1559351 | 8/2005 |
| EP | 1767129 | 3/2007 |
| EP | 1842467 | 10/2007 |
| EP | 1859713 | 11/2007 |
| EP | 1859714 B1 | 11/2007 |
| EP | 2033551 | 3/2009 |
| EP | 2071986 | 6/2009 |
| EP | 2071987 | 6/2009 |
| EP | 2230195 A1 | 9/2010 |
| EP | 2374383 B1 | 11/2011 |
| EP | 2409608 | 1/2012 |
| EP | 2409609 | 1/2012 |
| EP | 2471420 | 7/2012 |
| EP | 2687133 | 1/2014 |
| EP | 2 833 766 B1 | 2/2015 |
| WO | 0243541 | 6/2002 |
| WO | 2005016092 | 2/2005 |
| WO | 2006005736 | 1/2006 |
| WO | 2006014936 | 2/2006 |
| WO | 2006066625 | 6/2006 |
| WO | 2007016977 | 2/2007 |
| WO | 2007096196 | 8/2007 |
| WO | 2008004116 | 1/2008 |
| WO | 2008096385 | 8/2008 |
| WO | 2009016455 | 2/2009 |
| WO | 2009027131 | 3/2009 |
| WO | 2010013274 | 2/2010 |
| WO | 2010076698 | 7/2010 |
| WO | 2010134054 | 11/2010 |
| WO | 2011015978 | 2/2011 |
| WO | WO-2011/042401 A2 | 4/2011 |
| WO | 2011076750 | 6/2011 |
| WO | WO-2011/069829 A1 | 6/2011 |
| WO | 2011113854 A2 | 9/2011 |

(56) References Cited

FOREIGN PATENT DOCUMENTS

| WO | 2011121125 | 10/2011 |
| WO | 2012001115 | 1/2012 |
| WO | 2012156167 | 11/2012 |
| WO | 2013007776 | 1/2013 |
| WO | 2013008012 | 1/2013 |
| WO | WO-2013/079814 A1 | 6/2013 |
| WO | 2013144922 | 10/2013 |
| WO | 2014012778 | 1/2014 |
| WO | 2014012779 | 1/2014 |
| WO | 2014027079 | 2/2014 |
| WO | 2014029685 | 2/2014 |
| WO | 2014041605 | 3/2014 |
| WO | 2014056641 | 4/2014 |
| WO | 2014056642 | 4/2014 |
| WO | 2014056810 | 4/2014 |
| WO | 2014056821 | 4/2014 |
| WO | 2014060370 | 4/2014 |
| WO | WO-2014/056730 A1 | 4/2014 |
| WO | WO-2014/056862 A1 | 4/2014 |
| WO | 2014082975 | 6/2014 |
| WO | 2014082976 | 6/2014 |
| WO | 2014092406 | 6/2014 |
| WO | 2014096120 | 6/2014 |
| WO | 2014096121 | 6/2014 |
| WO | 2014132158 | 9/2014 |
| WO | 2014174462 | 10/2014 |
| WO | 2014183219 | 11/2014 |
| WO | 2014183783 | 11/2014 |
| WO | 2015004613 | 1/2015 |
| WO | 2015056022 | 4/2015 |
| WO | 2015082663 | 6/2015 |
| WO | 2015082664 | 6/2015 |
| WO | 2015086371 | 6/2015 |
| WO | WO-2015/082662 A1 | 6/2015 |
| WO | WO-2015/109052 A1 | 7/2015 |
| WO | 2015124627 | 8/2015 |
| WO | 2015158838 | 10/2015 |
| WO | WO-2015/144356 A1 | 10/2015 |
| WO | WO-2015/155145 A1 | 10/2015 |
| WO | WO-2015/173123 A1 | 11/2015 |
| WO | WO-2015/193744 A1 | 12/2015 |
| WO | 2016012562 | 1/2016 |
| WO | 2016055633 | 4/2016 |
| WO | 2016071795 | 5/2016 |
| WO | 2016082029 | 6/2016 |

OTHER PUBLICATIONS

International Preliminary Report on Patentability, PCT/NL2017/050510, 7 pages (dated Feb. 5, 2019).
International Preliminary Report on Patentability, PCT/NL2017/050511, 7 pages (dated Feb. 5, 2019).
International Preliminary Report on Patentability, PCT/NL2017/050512, 6 pages (dated Feb. 5, 2019).
International Preliminary Report on Patentability, PCT/NL2017/050513, 6 pages (dated Feb. 5, 2019).
International Preliminary Report on Patentability, PCT/NL2017/050514, 6 pages (dated Feb. 5, 2019).
International Preliminary Report on Patentability, PCT/NL2017/050515, 6 pages (dated Feb. 5, 2019).
International Preliminary Report on Patentability, PCT/NL2017/050519, 9 pages (dated Feb. 5, 2019).
International Preliminary Report on Patentability, PCT/NL2017/050521, 5 pages (dated Feb. 5, 2019).
International Preliminary Report on Patentability, PCT/NL2017/050522, 12 pages (dated Feb. 5, 2019).
Manual Jura Nespresso English, 22 pages.
Nespresso-I, 8 pages.
Nespresso-II, 2 pages (2003).
Nespresso-III, 2 pages (2003).
Nespresso-IV, 7 pages.
Nespresso-V, 5 pages (Apr. 2015).
International Search Report and Written Opinion, PCT/NL2017/050509, 11 pages (dated Jun. 5, 2018).
International Search Report and Written Opinion, PCT/NL2017/050510, 10 pages (dated Nov. 20, 2017).
International Search Report and Written Opinion, PCT/NL2017/050511, 9 pages (dated Nov. 30, 2017).
International Search Report and Written Opinion, PCT/NL2017/050512, 10 pages (dated Nov. 27, 2017).
International Search Report and Written Opinion, PCT/NL2017/050513, 8 pages (dated Dec. 22, 2017).
International Search Report and Written Opinion, PCT/NL2017/050514, 8 pages (dated Nov. 23, 2017).
International Search Report and Written Opinion, PCT/NL2017/050515, 10 pages (dated Nov. 27, 2017).
International Search Report and Written Opinion, PCT/NL2017/050519, 11 pages (dated Nov. 29, 2017).
International Search Report and Written Opinion, PCT/NL2017/050521, 8 pages (dated Dec. 4, 2017).
International Search Report and Written Opinion, PCT/NL2017/050522, 17 pages (dated Jan. 17, 2018).

* cited by examiner

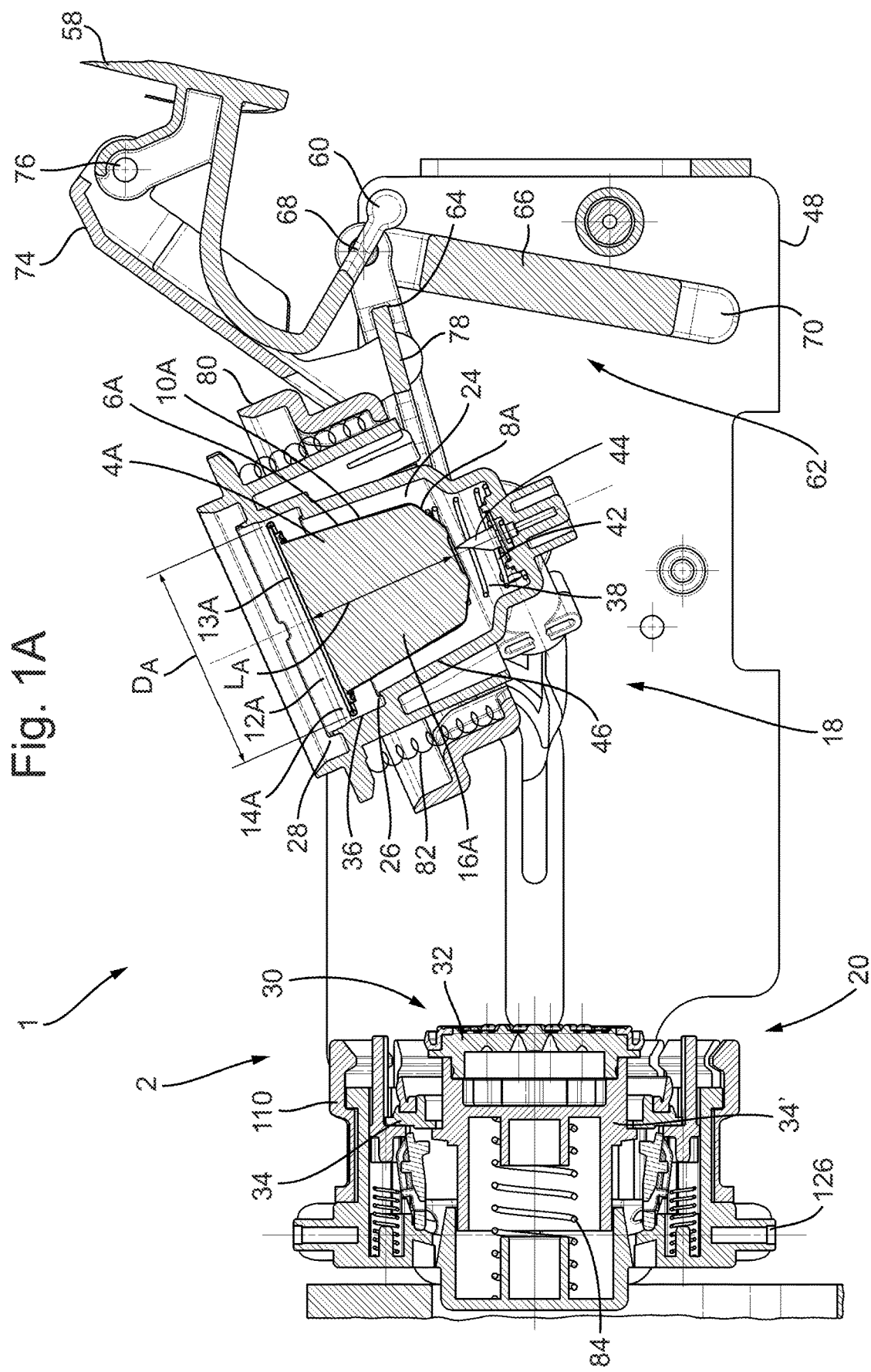

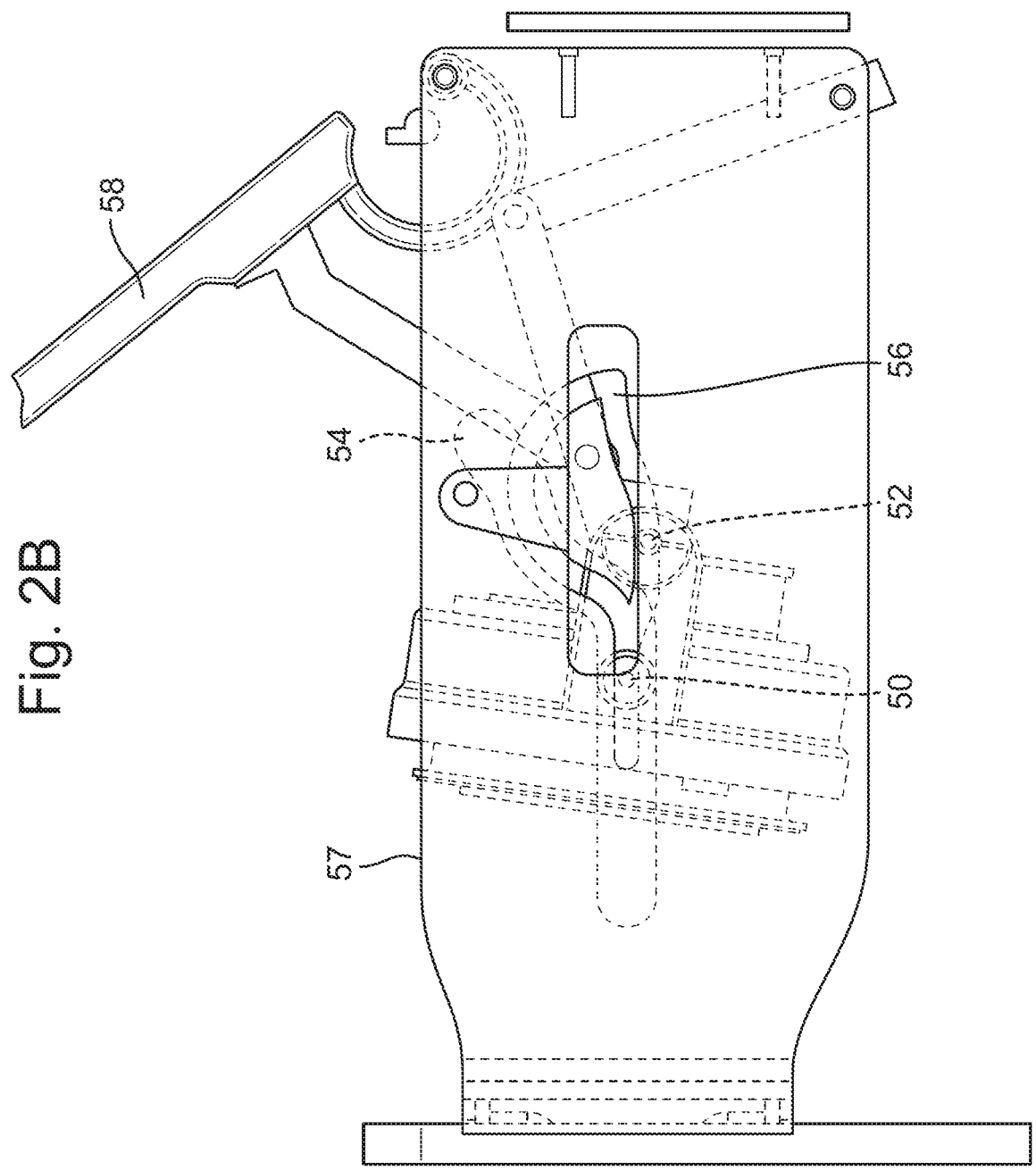

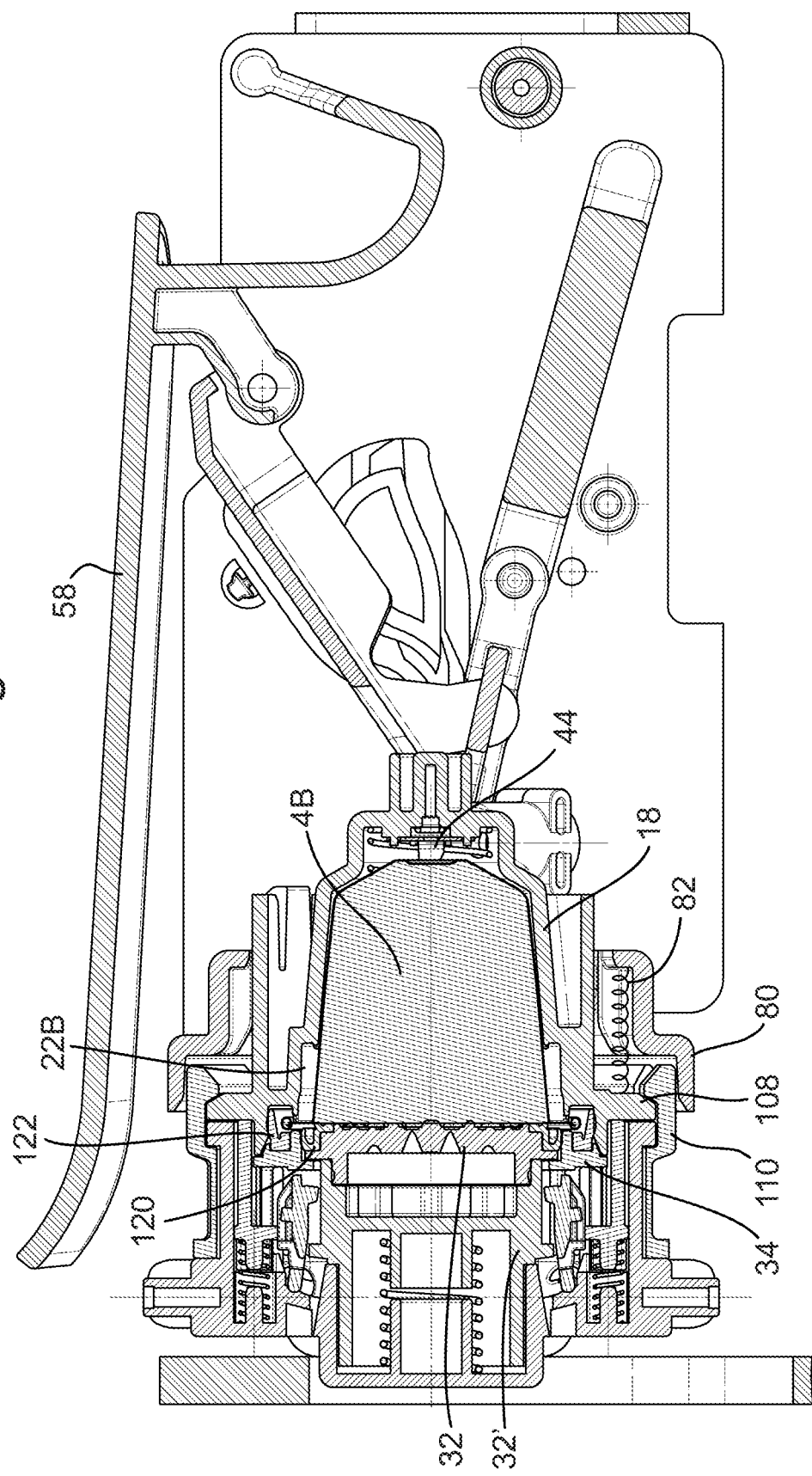

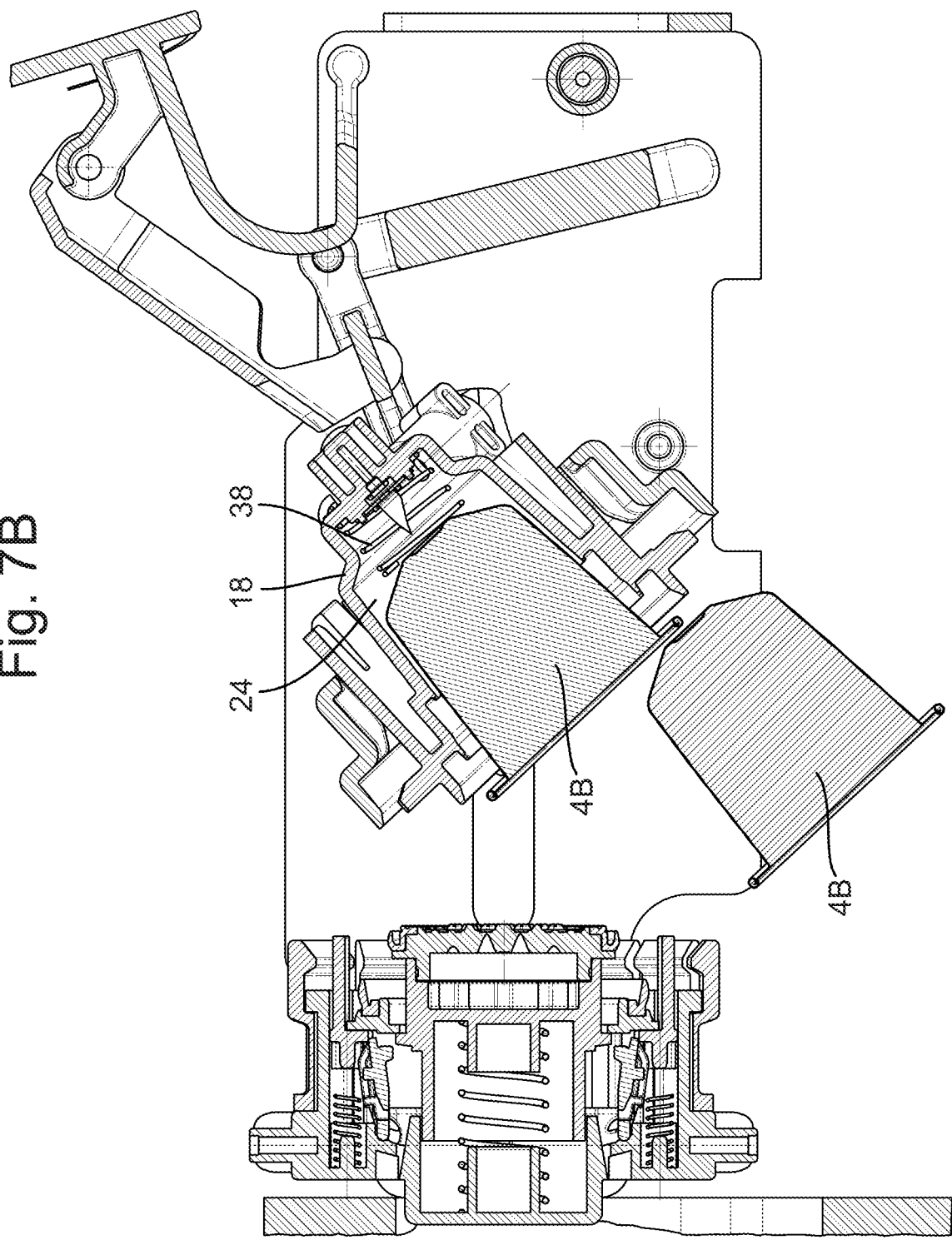

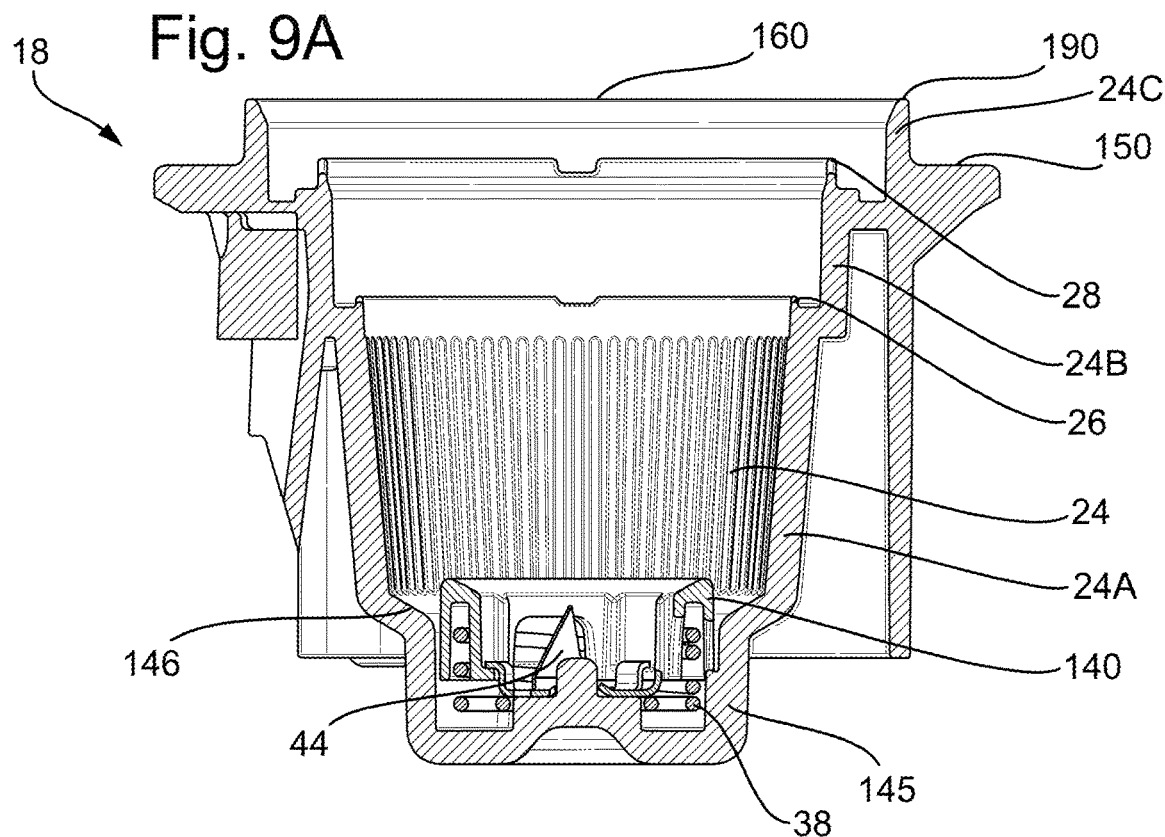
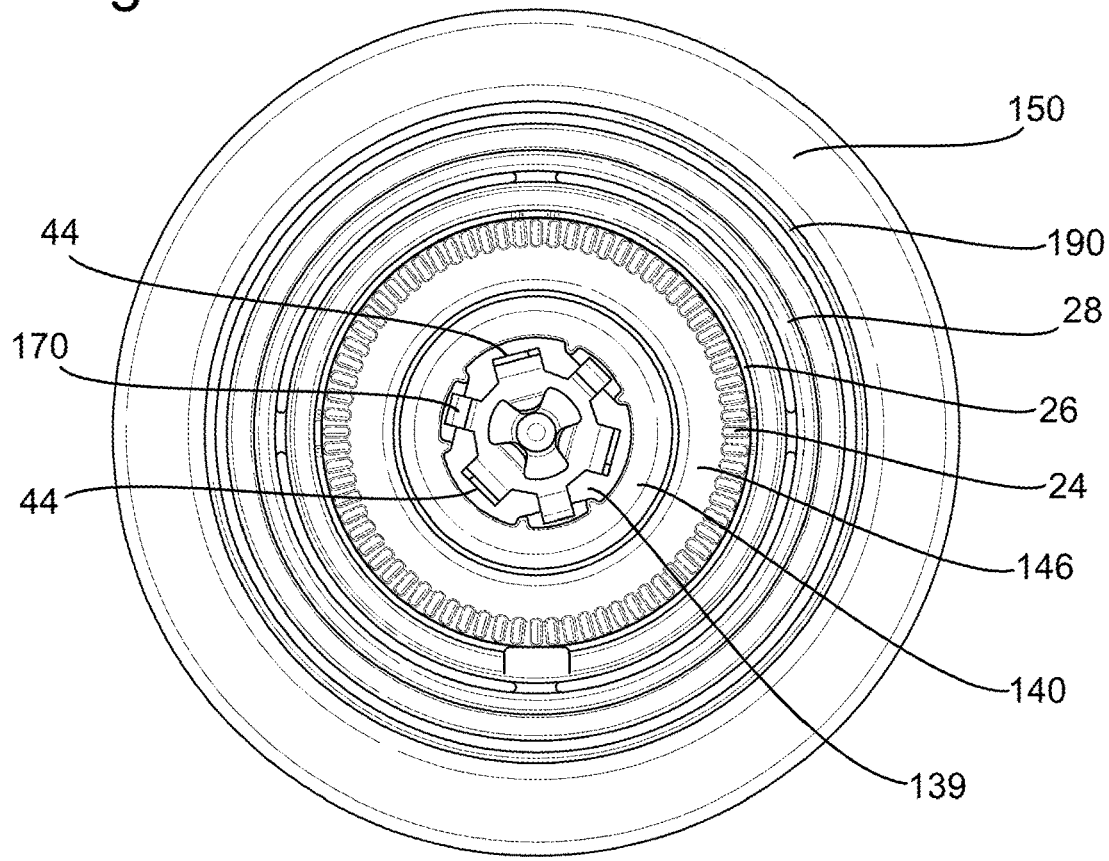

SYSTEM FOR PREPARING A QUANTITY OF BEVERAGE SUITABLE FOR CONSUMPTION

CROSS-REFERENCE TO RELATED APPLICATIONS

This application is a continuation of PCT/NL2017/050521, filed Aug. 3, 2017, which claims the benefit of and priority to Netherlands Patent Application Nos.:
NL 2017277 filed Aug. 3, 2016,
NL 2017278 filed Aug. 3, 2016,
NL 2017279 filed Aug. 3, 2016,
NL 2078280 filed Aug. 3, 2016,
NL 2017281 filed Aug. 3, 2016,
NL 2017282 filed Aug. 3, 2016,
NL 2017283 filed Aug. 3, 2016,
NL 2017284 filed Aug. 3, 2016,
NL 2017285 filed Aug. 3, 2016,
NL 2017286 filed Aug. 3, 2016,
NL 2019216 filed Jul. 10, 2017, and
NL 2019218 filed Jul. 10, 2017,
the entire contents of each of which are hereby incorporated herein by reference.

BACKGROUND

The invention generally relates to a system for preparing a beverage. The invention also relates to an apparatus for preparing a beverage. More specifically the invention relates to a system for preparing a beverage using a capsule.

Systems and apparatus for preparing a beverage using a capsule are generally known. The apparatus can be configured to receive a single type of capsule, but may also be arranged for receiving multiple types of capsules, for example for preparing different kinds of beverages, for example coffee, tea, hot chocolate, or different variants of coffee. The different capsules may not all have the same shape and/or size. An apparatus arranged for dealing with a plurality of different capsules may thus quickly become complicated and large in its structure, thus increasing its price. It may also become rather difficult to handle and to clean.

It is an object of the present invention to alleviate one or more of the above-mentioned problems. In particular, it is an aim of the invention to provide a compact system and apparatus for preparing a beverage using a capsule which is able to handle one of a plurality of capsules of different sizes. It is a further object of the invention to provide a system and apparatus for preparing a beverage using a capsule which is able to function equally well with each of a plurality of capsules of different sizes.

SUMMARY

According to a first aspect of the invention, there is provided a system characterized by the features of claim 1. In particular, the system for preparing a quantity of beverage suitable for consumption includes a second exchangeable capsule having a second lid and a second body comprising a second sidewall, a second bottom attached to a first end of the second sidewall and a circumferential outwardly extending second rim attached to a second end of the second sidewall, the first and second ends of the second sidewall laying opposite each other. The second lid is attached to the second rim for closing a second filling opening of the second body. The system can optionally include a first exchangeable capsule having a first lid and a first body comprising a first sidewall, a first bottom attached to a first end of the first sidewall and a circumferential outwardly extending first rim attached to a second end of the first sidewall, the first and second end of the first sidewall laying opposite each other. The first lid is attached to the first rim for closing a first filling opening of the first body. The system also includes an apparatus including a first brew chamber part having a cavity bounded by a chamber inner wall and a chamber bottom of the first brew chamber part. The cavity is arranged for selectively holding one of the first and second exchangeable capsules. The first brew chamber part further comprises a chamber fill opening for selectively loading the first or second capsule into the first brew chamber part. The chamber bottom and the chamber fill opening lay opposite each other. The first brew chamber part is further provided with at least one knife extending from the chamber bottom in the direction of the chamber fill opening. The apparatus further comprises a second brew chamber part for closing the chamber fill opening of the first brew chamber part thus forming a brew chamber. The first brew chamber part and the second capsule are adapted to each other such that the second bottom of the second capsule is pierced by the at least one knife if the second capsule is loaded into a brewing position of the second exchangeable capsule in the first brew chamber part and the first brew chamber part is closed by the second brew chamber part. The second brew chamber part has an extraction plate for abutting against the first or second lid if the first or second capsule is in its respective brewing position. The extraction plate includes a central portion and a peripheral portion, the central portion being axially movable relative to the peripheral portion from a first position to a second position and vice versa. If the first brew chamber part is closed by the second brew chamber part, a first distance exists in axial direction of the first brew chamber part between the central portion and the brew chamber bottom if the central portion is in the first position. If the first brew chamber part is closed by the second brew chamber part, a second distance exists between the central portion and the brew chamber bottom if the central portion is in the second position. The first distance is smaller than the second distance. The system further includes a mechanism for locking the central portion in the first position when the cavity holds the first exchangeable capsule in its brewing position, wherein the central portion lays against the first lid, and for pushing the central portion in the second position by means of the second capsule against the force of a spring when the first brew chamber part holds the second exchangeable capsule in its brewing position, wherein the central portion lays against the second lid. The first brew chamber part has a first portion extending from the bottom in the direction of the chamber fill opening and a second portion extending from the first portion in the direction of the chamber fill opening. The first portion has a largest inner diameter which is smaller than a smallest inner diameter of the second portion. The second capsule is dimensioned such that if the second capsule is located in the first brew chamber part in its brewing position the second rim is distanced in an axial direction of the first brew chamber part from a portion of the chamber inner wall of the first brew chamber part which is formed by the second portion. The second capsule can be dimensioned such that if the second capsule is located in the first brew chamber part in its brewing position the second rim is located outside the second portion of the first brew chamber part. The second capsule can be dimensioned such that if the second capsule is located in the first brew chamber part in its brewing position the distance in the axial direction of the first brew chamber part between said second rim and the portion of the chamber inner wall of the first brew chamber part which is formed by the second portion can be zero or more. In an inventive way, the first brew chamber part is further provided with an alignment cap which is movable in an axial direction of the first brew chamber part between a retracted position wherein the at least one knife extend through an opening of the alignment cap and an extended position wherein the alignment cap protrudes beyond the at least one knife as seen from the bottom of the first brew chamber part. The first brew chamber part is further provided with a resilient element which applies a force to the alignment cap in the direction from the retracted position to the extended position. The second capsule and the first brew chamber part are adapted to each other such that the bottom of the second capsule is centralized within the first brew chamber part if the second capsule is loaded in the first brew chamber part. The second capsule is dimensioned such as to allow efficient centring of the second capsule within the first brew chamber part. Centralizing of the second capsule within the first brew chamber part can be reached in multiple steps. A first centring step can be at loading of the second capsule into the first brew chamber part, when the alignment cap helps in centring the second bottom of said second capsule which second bottom is engaged by said alignment cap in the extended position. In a second, next step, the first brew chamber part is moved towards the extraction plate. The second lid of the second capsule engages the central portion of the extraction plate and pushes said central portion against a biasing force of the spring during which pushing further centring of the second capsule within the first brew chamber part takes place. Once the central portion of the extraction plate abuts against the peripheral portion of said extraction plate, in a third step further pushing of the first brew chamber part towards the extraction plate causes the alignment cap to move from an extended position into a retracted position against the force of the resilient element of the first brew chamber part thus further centralizing the second capsule within the first brew chamber part. In a fourth step piercing of the second bottom of the second capsule only occurs after full alignment of the second capsule within the first brew chamber part. As the alignment cap can provide a contact surface with the second bottom of the second capsule which is larger than a contact surface between the resilient element and the second capsule in case there is no alignment cap, the guiding of the second capsule within the first brew chamber part can be improved. Good alignment of the second capsule in its brewing position can improve the sealing of the brew chamber when the second brew chamber part closes off the first brew chamber part.

Optionally, an axial direction of the first brew chamber part can be angled relative to a horizontal direction so that the chamber fill opening faces upwardly in a state ready for receiving a first or second capsule, for example if the second capsule is being loaded in the first brew chamber part. Such a position can facilitate loading of the first or second capsule, as the first or second capsule can fall into place by the force of gravity. The alignment cap can align the bottom of the first or second capsule.

An axial direction of the first brew chamber part can be in a horizontal direction if the second capsule is positioned in the first brew chamber part and the first brew chamber part is being closed by the second brew chamber part to bring the second capsule in the brewing position. A substantially horizontal brewing position can be advantageous for a smooth flow of the beverage out of the capsule. Alternatively, the axial direction of the first brew chamber part may also make as slight angle with a horizontal direction, such as with the chamber fill opening of the first brew chamber part facing downwards.

Optionally, the second capsule and the first brew chamber part may be adapted to each other such that, if the second capsule is loaded in the first brew chamber part, the bottom of the second capsule is further centralized within the first brew chamber part while the first brew chamber part is being closed by the second brew chamber part, which corresponds to a second centring step as explained above. In particular, the second sidewall of the second capsule and a shape of the chamber inner sidewall of the first brew chamber part may be adapted to each other to centralize the second capsule within the first brew chamber part. Also a shape of the alignment cap and a shape of the bottom of the second capsule may be adapted to each other to further centralize the second capsule within the first brew chamber part. As previously mentioned, good alignment of the second capsule in its brewing position, i.e. such that a central axis of the capsule corresponds to a central axis of the first brew chamber part in an axial direction of the first brew chamber part, can improve the efficiency of the sealing when the second brew chamber part closes off the first brew chamber part to form the brew chamber.

Optionally, the second capsule and the first brew chamber part may be adapted to each other such that, if the second capsule is loaded in the first brew chamber part, the bottom of the second capsule is further centralized within the first brew chamber part while the first brew chamber part is closed by the second brew chamber part and before the at least one knife starts piercing the bottom of the second capsule. This can correspond to a third centring step as explained above, and can ensure that the second capsule is first centralized before it is being pierced.

Optionally, the system may be designed such that the second capsule is only starting to be pierced by the at least one knife if the alignment cap is moved A1 mm from the extended position in the direction of the retracted position wherein A1 is in the range of approximately 0.5-3 mm, such as for example 0.5-3 mm. In other words, a distal side of the alignment cap as seen from the bottom of the first brew chamber part can protrude beyond a top side of the at least one knife over a distance of approximately A1 in the extended position of the alignment cap. As a consequence, the second capsule can first be centralized before being pierced by the at least one knife. At the same time, said distance over which the alignment cap may protrude beyond the at least one knife can provide additional protection, both for the at least one knife as for a user of the system.

Optionally, an outer surface of the alignment cap which faces the fill opening can be of a concave shape and the outer surface of the bottom of the first or second capsule can be of a convex shape wherein the concave shape and the convex shape are corresponding shapes so that the bottom of the respective first or second capsule can be at least partially received within the alignment cap. The corresponding shapes of the bottom of the respective first or second capsule and the outer surface of the alignment cap can provide a relatively large engagement surface between the bottom of the capsule and the alignment cap, which can provide guiding of the capsule to have the capsule centralized within the first brew chamber part.

In the retracted position of the alignment cap a portion of the outer surface of the alignment cap which faces the fill opening of the first brew chamber part, and a portion of the surface of the bottom of the first brew chamber part which faces the fill opening and extends radially outwards relative to the alignment cap can lay flush and can, in combination, form a combined surface having a concave first shape. The outer surface of the bottom of the second capsule has a convex second shape which is complementary to the concave first shape so that in the brewing position the bottom of the second capsule fits snugly in a space bounded by the combined surface which has the first shape. Hence, the shape of the bottom of the second capsule and the shape of the combined surface can provide a matching fit leading to a stable brewing position of the second capsule.

Optionally, the first brew chamber part can have a third portion extending from the second portion in the direction of the chamber fill opening, the second portion having a largest diameter which is smaller than a smallest diameter of the third portion. If the second capsule is in the brewing position, the second rim can be adjacent the chamber inner sidewall of the first brew chamber part formed by the third portion. The third portion of the first brewing chamber part can provide additional space which can be useful for, among other things, sealing of the brew chamber in the brewing position of the second capsule.

Optionally, the second capsule can have such a length in an axial direction of the second capsule that if a bottom of the second capsule contacts the alignment cap upon loading while the alignment cap is in the extended position, the second rim is positioned at least partially outside the contour of the first brew chamber part. It may also be possible that the second lid is at least partially outside the contour of the first brew chamber part.

Optionally, the second capsule may have such a length in an axial direction of the second capsule that if a bottom of the second capsule contacts the alignment cap while the alignment cap is in the retracted position, the second rim is positioned inside the contour of the first brew chamber part, allowing closing of the first brew chamber part by the second brew chamber part to form a brew chamber in the brewing position of the second capsule.

Optionally, the second capsule can have such a shape that if the second capsule is in the brewing position an outer surface of at least a portion of the sidewall of the second capsule lays adjacent to the chamber inner side wall of the first brew chamber part formed by the first portion. Preferably, an inner diameter of the first brew chamber part formed by the first portion is substantially similar to an outer diameter of at least a portion of the sidewall of the second capsule, so that hardly any space is left between the sidewall of the second capsule and an inner side wall of the first brew chamber part formed by the first portion when the second capsule is in its brewing position, forcing liquid to pass substantially through the second capsule, thus minimizing waste of liquid.

Optionally, the first capsule may be dimensioned such that if the first capsule is located in the first brew chamber part in the brewing position then the first rim is adjacent a portion of the chamber inner side wall of the first brew chamber part which is formed by the second portion of the first brew chamber part.

Optionally, the cavity of the first brew chamber part can comprise a sudden increase of its diameter at the transition area between the first portion and the second portion of the first brew chamber part. Such a stepped diameter can provide a transition area which can form an abutment surface against which a first rim of the first capsule can abut when the first capsule is in its brewing position. At the same time, the shape of the first portion of the first brew chamber part can match as closely as possible a shape of the second capsule, whereas the second portion of the first brew chamber part can provide a receiving space for receiving an outer part of the central portion of the extraction plate when the first capsule is in its brewing position.

Optionally, the second capsule can have such a shape that during loading, if the axial direction of the first brew chamber is angled relative to a horizontal direction, the second capsule is first guided downwards into the cavity by a lower part of the chamber side wall formed by the first portion wherein subsequently the bottom of the capsule engages the alignment cap such that the capsule is at least partly centralised within the cavity while the capsule bottom is not pierced by the at least one knife and in that the second capsule has such a shape that during loading if the cavity is subsequently tilted so that the axial direction of the first brew chamber is directed horizontally the capsule is at least further centralised within the cavity while the capsule is further pushed into the first brew chamber part by means of the second brew chamber part upon closing of the first brew chamber part by the second brew chamber part. As such, dimensions and shape of the second capsule and of the first brew chamber part are adapted to each other to optimize centralization of the second capsule in the first brew chamber part, optionally in different steps from the loading of the second capsule into the first brew chamber part until just before piercing of the bottom of the second capsule by the at least one knife.

Optionally, the mechanism may be arranged for preventing the central portion being locked in the first position when the cavity holds the second exchangeable capsule. Optionally, the mechanism may also be arranged for allowing the central portion being moved into the second position when the cavity holds the second exchangeable capsule. In the general, the locking mechanism may provide the possibility of using a first exchangeable capsule or a second exchangeable capsule which are different in size, the mechanism being arranged such that the extraction plate can take up a correct position for a first or second brewing position of the first or second capsule, preferably without any input of a user.

Optionally, the system can be arranged such that, while closing the first brew chamber part against the second brew chamber part, when the cavity holds the second exchangeable capsule, the central portion is pushed by the second exchangeable capsule in an axial direction of the first brew chamber part in a direction from the first position to the second position and beyond the first position as seen from the at least one knife so that no locking takes place in the first position. During loading of a second capsule, the central portion of the extraction plate can be in a ready position, from which ready position the central portion passes the first position without being locked while being moved to the second position.

Optionally, the system can be arranged such that, while closing the first brew chamber part against the second brew chamber part, when the cavity holds the first exchangeable capsule, the mechanism is actuated by the first brew chamber part before the central portion is pushed beyond the mechanism and especially beyond a locker of the mechanism by the first exchangeable capsule. The locking mechanism may include a locker and especially a pivotable finger for locking the central portion especially in the first position, the locker being activated by the activator preferably during the movement of the first brew chamber part. The locker can be directly or indirectly activated by the activator and can further provide a single-sided locking or a double-sided locking. This means that by the locking mechanism locking of the central portion against movement from the first position to the second position can be provided, allowing movement in the opposite direction, e.g. from the first and/or second position to the ready position.

Optionally, the central portion can include a first sealing member arranged for providing a fluid sealing engagement between the central portion and the peripheral portion when forming the brew chamber for holding the second exchangeable capsule; and wherein the peripheral portion includes a second sealing member arranged for providing a fluid sealing engagement between the peripheral portion and the first brew chamber part when forming the brew chamber for holding the second exchangeable capsule and wherein the first sealing member is arranged for providing a fluid sealing engagement between the central portion and the second exchangeable capsule when forming the brew chamber for holding the second exchangeable capsule. Said first sealing member can provide a seal against a prepared beverage exiting the capsule via an exit area. The first sealing member may be in direct sealing contact with a part of the peripheral portion protruding between the first sealing member and the second sealing member when forming the brew chamber for holding the second capsule. Alternatively, the first sealing member may be in direct sealing contact with the second sealing member included in the peripheral portion. Said second sealing member may provide a seal for water being present in the cavity outside the capsule. In this way, brewing fluid injected into the brew chamber is prevented from bypassing around the outside of the capsule. The first sealing member can also provide a sealing engagement between the central portion and the second exchangeable capsule against beverage exiting the capsule via the exit area of the second exchangeable capsule. The combination of these two sealing members allows a good functioning of the system, independently of the choice of one of the first and second exchangeable capsule.

Optionally, the second sealing member may be arranged for providing a fluid sealing engagement between the peripheral portion and the second exchangeable capsule when forming the brew chamber for the second exchangeable capsule holding the second exchangeable capsule. This can provide a sealing or non-sealing engagement between the peripheral portion and the capsule against brewing fluid and/or beverage exiting the capsule via the exit area of the second capsule.

Optionally, a side of the rim of the second exchangeable capsule facing away from a cup-shaped body of the second exchangeable capsule may be pressed against the second sealing member by a second abutment surface of the first brew chamber part, thus providing an efficient and easy-to-build sealing or non-sealing engagement between the peripheral portion of the second brew chamber part and the second capsule.

Optionally, the first brew chamber part may be provided with a third sealing member arranged for providing a fluid sealing engagement between the first brew chamber part and a side of the rim of the second exchangeable capsule facing towards a cup-shaped body of the second exchangeable capsule, thus providing an alternative sealing engagement between the first brew chamber part and the second brew chamber part. In combination with said second sealing member, said third sealing member may reduce the sealing effort by the second sealing member.

Optionally, the first sealing member can be arranged to provide a fluid sealing engagement between the central portion and the first brew chamber part when forming the brew chamber for the first exchangeable capsule. Advantageously, the first sealing member may be arranged to provide a self-reinforcing fluid sealing engagement between the central portion and the first brew chamber part under the effect of fluid pressure in the brew chamber when forming the brew chamber for the first exchangeable capsule. Brewing fluid may be injected into the brew chamber under relatively high pressure, which may deform said first sealing member in such a way that the fluid sealing engagement between the central portion and the first brew chamber part is reinforced. The first sealing member may take different shapes to reach said self-reinforcing sealing effect. It is for example preferred that the first sealing member may include a resilient lip arranged to provide a self-reinforcing sealing engagement between the central portion and the first brew chamber part under the effect of fluid pressure in the brew chamber when forming the brew chamber for the first exchangeable capsule. The resiliency of said lip may for example be higher than the resiliency of other parts of said sealing member. Other shapes of said first sealing member are of course also possible.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIGS. 1A and 1B show schematic representations of a system;

FIG. 2B shows a perspective side view of an apparatus in fully closed state;

FIGS. 6A-6B show the first capsule in the brew chamber during extraction and the second capsule in the brew chamber during extraction, respectively;

FIGS. 7A-7B show the first brew chamber part swiveled downwards for ejection of the used first and second capsule, respectively, from the cavity under the effect of gravity;

FIGS. 9A-9C show a cross-sectional view, a top view, and a detail of the cross-sectional view, respectively, of a system's first brew chamber part provided with an alignment cap;

DETAILED DESCRIPTION

Figure 1B:
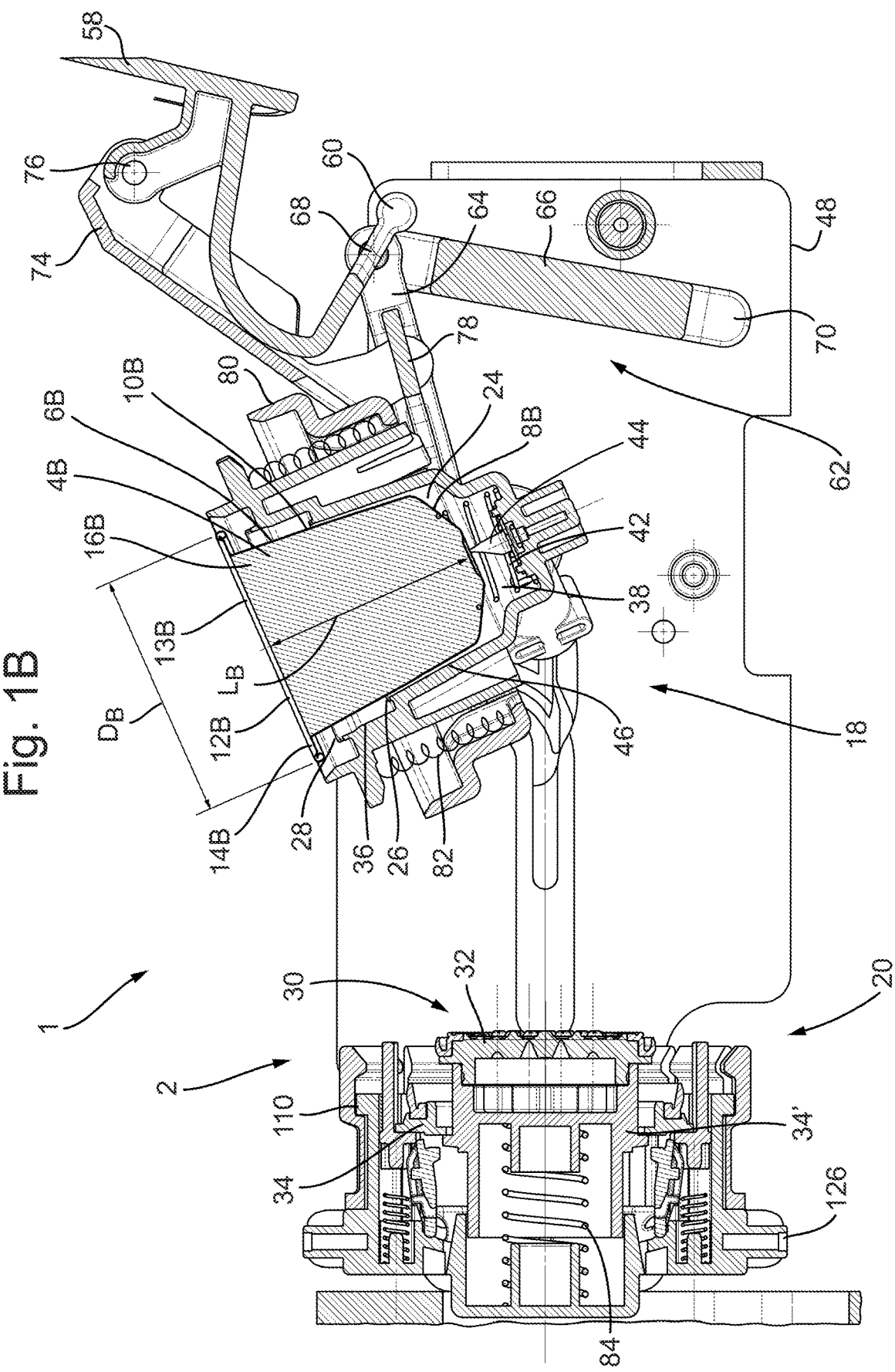

FIGS. 1A and 1B show schematic cross sectional views of a system 1 for preparing a beverage. The system includes an apparatus 2 and an exchangeable capsule. Here the system 1 is arranged for cooperating with a first capsule 4A and a second capsule 4B. The apparatus 2 shown in FIGS. 1A and 1B is one and the same apparatus. The apparatus 2 is arranged for selectively cooperating with either the first capsule 4A (see FIG. 1A) or the second capsule 4B (see FIG. 1B). It will be appreciated that the system 1 can include the apparatus 2, the first capsule 4A and the second capsule 4B.

The first and second capsules 4A, 4B are of a different type. In this example, the second capsule 4B is larger than the first capsule 4A. An axial length LB of the second capsule 4B is larger than an axial length LA of the first capsule 4A. A diameter DB of the second capsule 4B is a larger than a diameter DA of the first capsule 4A. Notwithstanding the differences, in this example the first and second capsules 4A, 4B are designed to make a similar visual impression. The first and second capsules 4A, 4B are designed to have a family look and feel. Here a ratio of the axial length and diameter LA/DA of the first capsule 4A is substantially the same as a ratio of the axial length and diameter LB/DB of the second capsule 4B. Preferably, the length to diameter ratio of the first and second capsules is identical within 20%, preferably within 10%, e.g. identical.

In view of the similarity, both capsules 4A, 4B will now be described simultaneously. In this example, the capsules 4A, 4B both include a cup-shaped body 6A, 6B. Here the cup-shaped body 6A, 6B includes a bottom 8A, 8B and a circumferential wall 10A, 10B. The bottom 8A, 8B and the circumferential wall 10A, 10B can form a monolithic part. The capsules 4A, 4B both include a lid 12A, 12B. The lid 12A, 12B closes off an open end of the cup-shaped body 6A, 6B. The lid 12A, 12B includes an exit area 13A, 13B through which beverage can be drained from the capsule as explained below. In this example the lid 12A, 12B is connected to a flange-like rim 14A, 14B of the capsule 4A, 4B. Here the rim 14A, 14B is an outwardly extending rim. The bottom 8A, 8B, the circumferential wall 10A, 10B and the rim 14A, 14B can form a monolithic part. Here the exit area 13A, 13B defines the area of the lid 12A, 12B through which the beverage can potentially exit the capsule 4A, 4B. Hence, an area of the lid 12A, 12B sealed to the rim 14A, 14B does not constitute part of the exit area 13A, 13B. In this example, the capsules 4A, 4B are substantially rotation symmetric around an axis extending from the bottom 8A, 8B to the lid 12A, 12B. The cup-shaped body 6A, 6B and the lid 12A, 12B enclose an inner space 16A, 16B of the capsule. The inner space 16A, 16B includes a quantity of beverage ingredient, such as an extractable or soluble substance. The beverage ingredient can e.g. be roast and ground coffee, tea, or the like. The beverage ingredient can be powdered coffee. The beverage ingredient can be a liquid. In view of the difference in size of the capsules 4A, 4B it will be appreciated that the second capsule 4B can include a larger quantity of beverage ingredient than the first capsule 4A. In this example, the inner space 16B of the second capsule 4B is about twice the inner space 16A of the first capsule 4A. For example, the first capsule 4A may include 4-8 grams, e.g. about 6 grams, of ground coffee. For example, the second capsule 4B may include 8-16 grams, e.g. about 12 grams, of ground coffee.

The cup-shaped body 6A, 6B can be manufactured from a metal foil, such as aluminium foil, a plastics material, such as polypropylene or polyethylene, or a combination thereof. The cup-shaped body 6A, 6B can be manufactured by pressing, deep-drawing, vacuum forming, injection moulding or the like. The lid can be manufactured from a metal foil, such as aluminium foil, a plastics material, such as polypropylene or polyethylene, or a combination thereof. In the example the capsules 4A, 4B are so-called closed capsules. This indicates capsules that are hermetically closed prior to insertion into the apparatus. The closed capsules can be opened by the apparatus as described below. Alternatively, non-sealed or refillable capsules could also be used.

The apparatus includes a first brew chamber part 18 and a second brew chamber part 20. The first and second brew chamber parts 18, 20 can be closed against each other to form a brew chamber 22A, 22B (not shown in FIGS. 1A, 1B).

The first brew chamber part 18 includes a cavity 24. The cavity 24 is arranged for receiving the first or second capsule 4A, 4B. Here the cavity 24 of the first brew chamber part 18 is a predetermined cavity 24 arranged for holding the first or second capsule 4A, 4B. Here the cavity 24 has an invariable shape for holding the first or second capsule 4A, 4B. Here the first brew chamber part 18 is arranged for holding the first or second capsule 4A, 4B without changing a configuration of the first brew chamber part 18. In this example the first brew chamber part 18 is a monolithic part. In this example the first brew chamber part 18 includes a first abutment surface 26. The first abutment surface is positioned inside the cavity 24. Here the first abutment surface 26 is a first generally annular abutment surface. The first generally annular abutment surface 26 can be continuously annular, or it may be interrupted annular, such as comprising a plurality of segments along an annulus. The first abutment surface 26 may for example take the shape of one or more, e.g. arched, ridges which protrude into cavity 24. Here the first abutment surface 26 provides the cavity 24 with a stepped shape. In this example the first brew chamber part 18 includes a second abutment surface 28. The second abutment surface is positioned near the open end of the cavity 24. Here the second abutment surface 28 is a second generally annular abutment surface. The second generally annular abutment surface 28 can be continuously annular, or it may be interrupted annular, such as comprising a plurality of segments along an annulus. The second abutment surface 28 may for example take the shape of one or more, e.g. arched, ridges. It will be appreciated that the first abutment surface 26 and the second abutment surface 28 are spaced at a mutual distance in an axial direction of the first brew chamber part 18. The first abutment surface 26 and the second abutment surface are positioned at a fixed spacing. The first abutment surface 26 and the second abutment surface are immobile relative to each other. Here, the first brew chamber part 18 includes an ejector 38. The ejector 38 can include an alignment cap, for example embodied as a conical ring, and/or a resilient element 42, here a helical spring. The first brew chamber part 18 includes piercing means 44 for piercing the bottom of the capsule. Here the piercing means includes a plurality of knives, such as three knives.

The second brew chamber part 20 includes an extraction plate 30. In this example, the extraction plate 30 includes a central portion 32 and a peripheral portion 34. The central portion 32 is movable relative to the peripheral portion 34.

Here the central portion 32 is movable in an axial direction of the second brew chamber part 20.

The system 1 as described thus far can be used for preparing a beverage as follows. Further features of the system 1 will be explained along the way.

In the example of FIGS. 1A and 1B the apparatus 2 is in a state ready for receiving a capsule. In FIGS. 1A and 1B the capsule 4A, 4B has just been inserted into the cavity of the first brew chamber part 18. The first brew chamber part 18 is in an inclined position. The open end of the cavity 24 points upwards.

As shown in FIG. 1A, the first capsule 4A can fall into the cavity 24 under the influence of gravity. Herein the rim 14A of the first capsule 4A is guided by an inner surface 36 of the first brew chamber part 18. The bottom 8A of the first capsule 4A lowers into the cavity 24 until it abuts against the ejector 38, or against an alignment cap (not shown). Here the bottom 8A of the first capsule 4A centers on the ejector 38, or on the alignment cap if present. This may constitute a first alignment step of the first capsule 4A. It will be appreciated that the rim 14A of the first capsule 4A is positioned between the first abutment surface 26 and the second abutment surface 28. The bottom 8A of the first capsule 4A is not yet pierced in this state.

As shown in FIG. 1B, the second capsule 4B can also fall into the cavity 24 under the influence of gravity. Herein the circumferential wall 10B of the second capsule 4B is guided by an inner surface 46 of the first brew chamber part 18. The bottom 8B of the second capsule 4B lowers into the cavity 24 until it abuts against the ejector 38, or against an alignment cap (not shown). Here the bottom 8B of the second capsule 4B centers on the ejector 38, or on the alignment cap if present. This may constitute a first alignment step of the second capsule 4B. It will be appreciated that the rim 14B of the second capsule 4B is positioned beyond the second abutment surface 28 when seen from the piercing means 44. The bottom 8B of the second capsule 4B is not yet pierced in this state.

Once the capsule 4A, 4B is inserted into the cavity 24 as shown in FIGS. 1A and 1B, the first brew chamber part 18 can be moved towards the second brew chamber part 20 for closing the brew chamber around the capsule 4A, 4B. The first brew chamber part 18 is guided in a frame 48 of the apparatus.

Figure 2A:
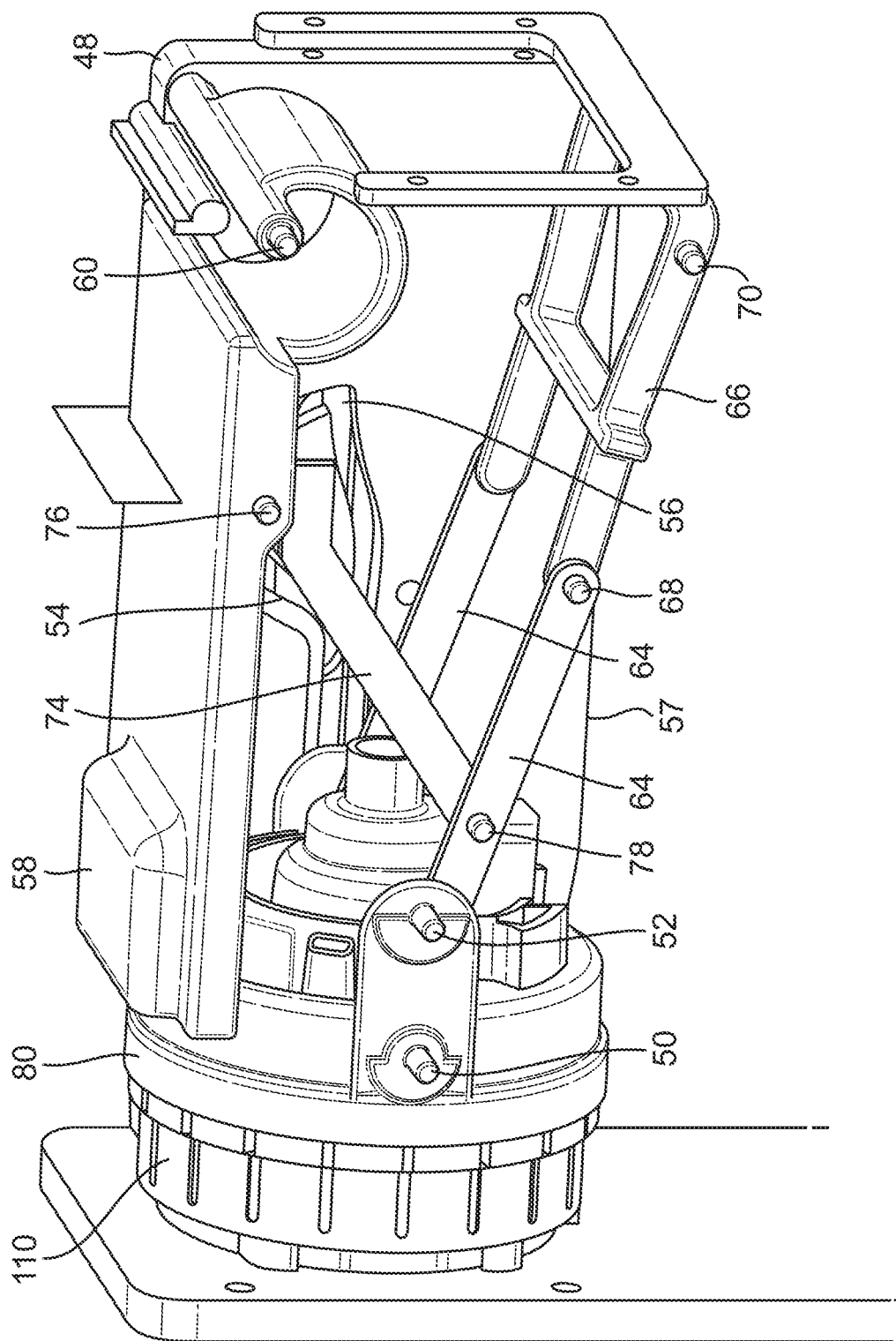
FIG. 2A shows a perspective side view of an apparatus in half-closed state.

In this example the first brew chamber part 18 includes first bosses 50 and second bosses 52 as shown in FIGS. 2A and 2B. The first bosses 50 are guided in a first groove 54 of the frame 48. The second bosses 52 are guided in a second groove 56 of the frame 48. It will be appreciated that the bosses 50, 52 and grooves 54, 56 determine the path that will be followed by the first brew chamber part 18. Here the first groove 54 and the second groove 56 are provided in a side wall 57 of the frame 48. The first groove 54 extends into the side wall 57 to a first depth. The second groove 56 extends into the side wall to a second depth. The second depth is larger than the first depth. The first boss 50 has a larger diameter than the second boss 52. The first groove 54 has a larger width than the second groove 56. The width of the first groove 54 corresponds to the diameter of the first boss 50. The width of the second groove 56 corresponds to the width of the second boss 52. It will be appreciated that the first groove 54 extends along a different trajectory than the second groove 56. The different widths and depths of the grooves allow the first and second bosses 50, 52 to follow different trajectories. This construction allows a very compact construction for guiding the first and second bosses 50, 52.

The apparatus 2 includes a lever 58. The lever can be actuated manually by a user. The lever is pivotally connected to the frame 48 around a lever axis 60. The first brew chamber part 18 is connected to the frame 48 via a knee joint 62. The knee joint 62 includes a push rod 64 and a crank 66. The push rod 64 is pivotally connected to the crank 66 at a knee axis 68. The crank 66 is pivotally connected to the frame 48 at a crank axis 70. The lever 58 is connected to the knee joint 62 for actuating the first brew chamber part 18 in motion. Here the lever 58 is connected to the knee joint 62 through a lever link 74. The lever link 74 is pivotally connected to the lever 58 at a lever link axis 76. The lever link 74 is pivotally connected to the push rod 74 at a knee link axis 78.

An arresting ring 80 is arranged surrounding the first brew chamber part 18. The arresting ring 80 is axially movable relative to the first brew chamber part 18. Here, the arresting ring 80 is guided by an external surface of the first brew chamber part 18. The arresting ring is connected to the first brew chamber part via one or more resilient elements 82, here helical springs. The push rod is pivotally connected to the arresting ring 80 at a push rod axis 72. Hence, here the knee joint 62 is indirectly connected to the first brew chamber part 18, viz. via the arresting ring 80 and one or more resilient elements 82. The function of the arresting ring will be set out below.

When the lever 58 is moved in a downward direction the knee joint 62 will push the first brew chamber part 18 towards the second brew chamber part 20. Simultaneously, due to the shape of the first and second grooves 54, 56, the first brew chamber part 18 will be rotated from the upwards inclined orientation into an aligned orientation in which an axial direction of the first brew chamber part 18 is aligned with an axial direction of the second brew chamber part 20.

As mentioned above, the apparatus 2 is arranged for selectively cooperating with either the first capsule 4A or the second capsule 4B. Here, the system 1 is arranged for automatically adjusting the brew chamber depending on whether the first or the second capsule has been inserted. This provides the advantage that no user input is required for selecting proper handling of the first or second capsule. Hence, the risk of errors is greatly reduced.

As mentioned, the second brew chamber part 20 includes an extraction plate 30 with a central portion 32 and a peripheral portion 34. Here the central portion 32 is movable in an axial direction of the second brew chamber part 20. The central portion 32 in this example includes a shaft 32' axially slidably movable with respect to the frame 48. The central portion 32 is connected to the frame 48 via a resilient member 84, here a helical spring. The resilient member 84 biases the central portion into a ready position in FIGS. 1A and 1B. The ready position is an extended position in this example. The central portion 32 can be positioned in a first brewing position for cooperating with the first capsule 4A. The central portion can be positioned in a second brewing position for cooperating with the second capsule 4B. In this example, the system 1 includes a locking mechanism 86 arranged for locking the central portion 32 in or near the first brewing position when the cavity 24 holds the first capsule 4A.

The locking mechanism 86 includes a locker 88. Here the locker 88 is designed as a pivotable finger, pivotable around a pivoting axis 90. The locker 88 is biased into a position pivoted away from the shaft 32'. The locker could also be biased into any other suitable position. The locking mechanism 86 further includes a pusher 92. The pusher is slidably guided in a body 94 of the second brew part 20. The pusher 92 is connected to the body 94 via a resilient member 96, here a helical spring. The resilient member 96 biases the pusher in an extended position. The first brew chamber part 18 includes an actuator 98. Here the actuator is formed by a frontal surface of the first brew chamber part 18.

Figure 3A:
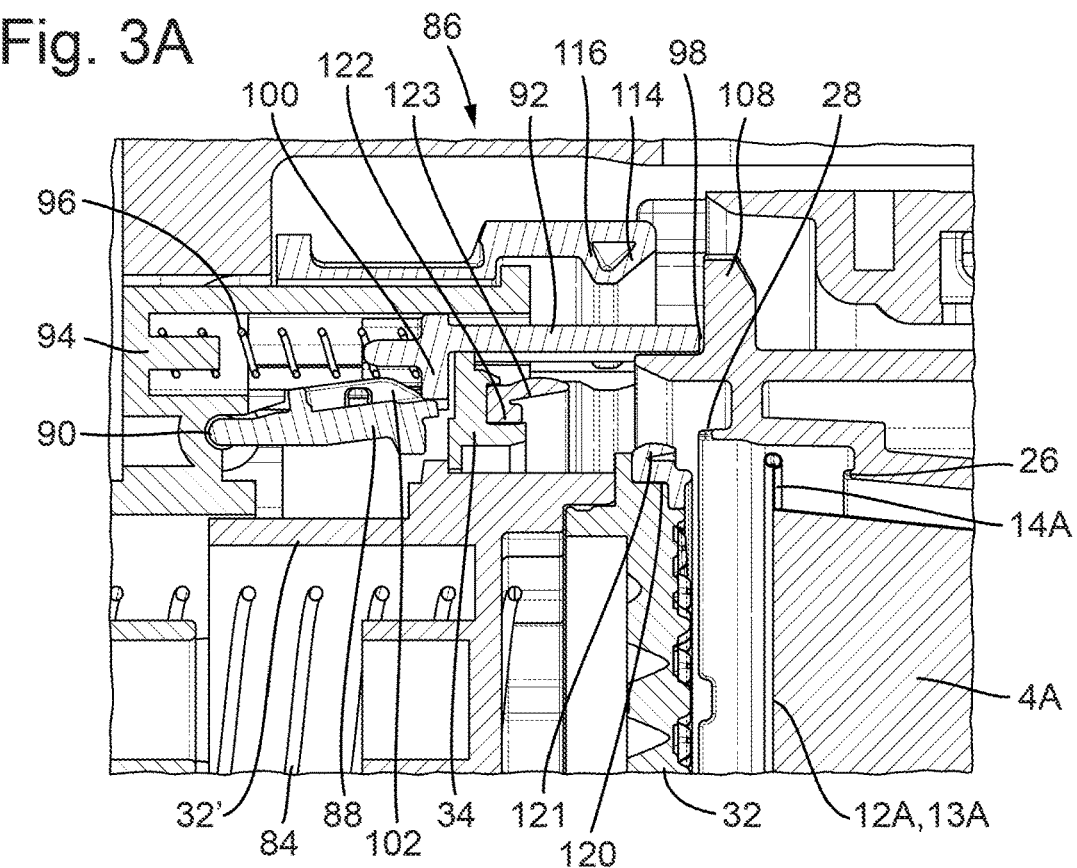
FIGS. 3A-3B show the functioning of the locking mechanism of the system as shown in FIG. 1A when the cavity holds the first capsule.
Figure 3B:
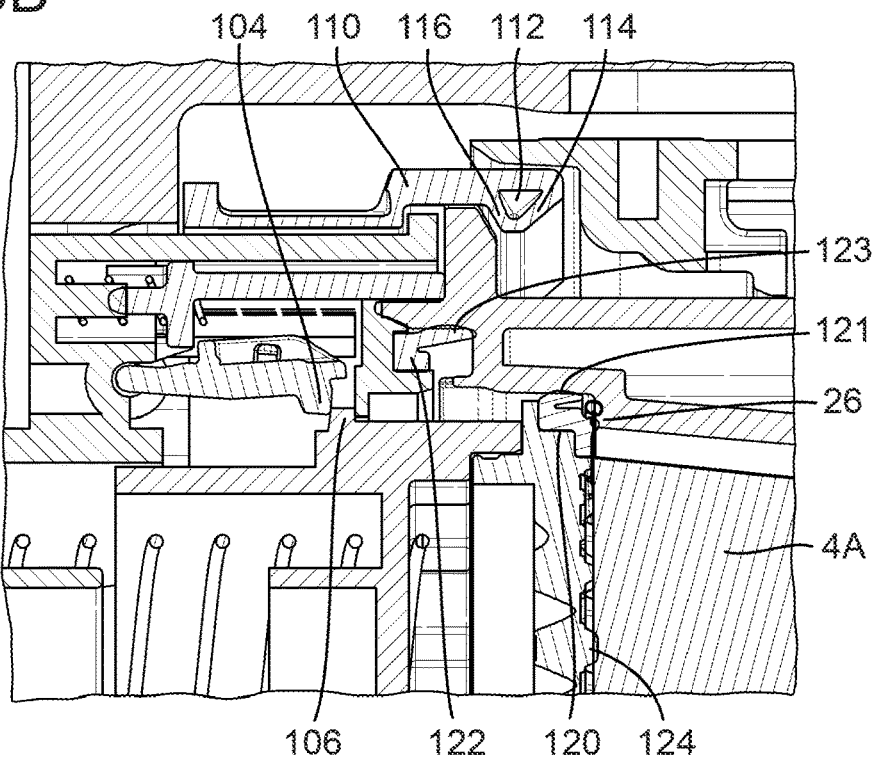

FIGS. 3A and 3B show functioning of the locking mechanism 86 when the cavity 24 holds the first capsule 4A. In this example, an outermost part of the first capsule 4A, here formed by the lid 12A, exit area 13A and/or rim 14A, is positioned rearwards, i.e. more towards the piercing means 44, relative to the actuator 98. As a result, when advancing the first capsule 4A towards the second brew chamber part 20, the actuator 98 will touch the pusher 92 before the outermost part of the first capsule 4A will touch the central portion 32. The pusher is pushed against the biasing force of the resilient member 96. A lip 100 of the pusher 92 will slide along a sloping surface 102 of the locker 88, causing the locker 88 to pivot towards the shaft 32'. As a result, a thumb 104 of the locker 88 is placed in a path of movement of part 106 of the central portion 32 (see FIG. 3B). When the first capsule 4A is advanced further towards the second brew chamber part 20 the first capsule 4A will abut against the central portion 32. This can cause the central portion to be pushed against the biasing force of the resilient member 84. The pivoted locker 88 prevents travel of the central portion beyond a position where the part 106 abuts against the thumb 104. This is herein defined as the first brewing position. Hence, the first capsule 4A is arranged for moving the central portion 32 from the ready position to the first brewing position. The first capsule 4A is held between the first and second brew chamber parts 18, 20 while brewing, wherein the central portion 32 is in the first brewing position.

Figure 4A:
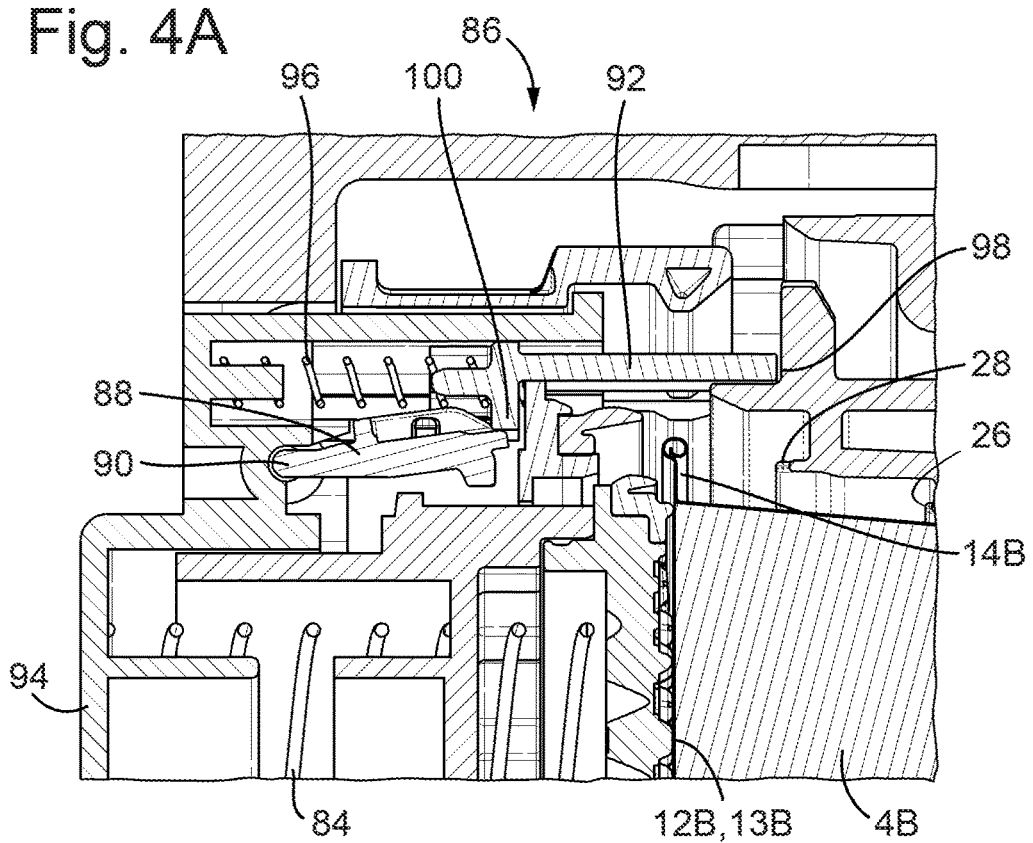
FIGS. 4A-4B show the functioning of the locking mechanism of the system as shown in FIG. 1B when the cavity holds the second capsule.
Figure 4B:
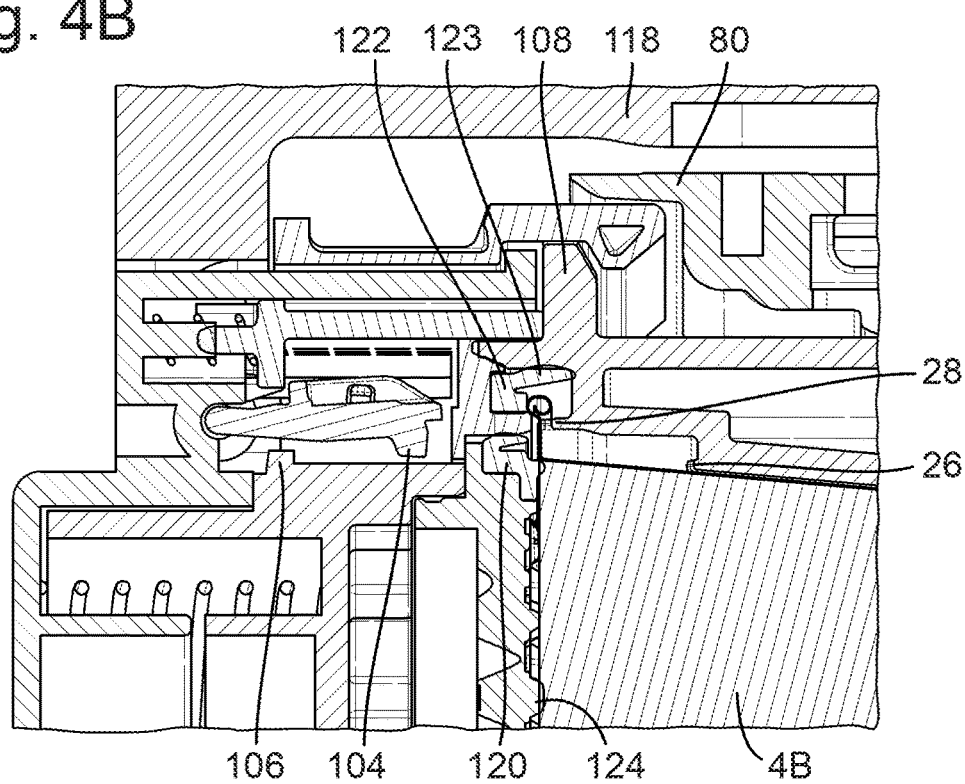

FIGS. 4A and 4B show functioning of the locking mechanism 86 when the cavity 24 holds the second capsule 4B. In this example, an outermost part of the second capsule 4B, here formed by the lid 12B, exit area 13B and/or rim 14B, is positioned forwardly, i.e. more towards the second brew chamber part 20, relative to the actuator 98. As a result, when advancing the second capsule 4B towards the second brew chamber part 20, the outermost part of the second capsule 4B will abut against the central portion 32 before the actuator 98 will touch the pusher 92. The central portion 32 is pushed against the biasing force of the resilient member 84 while the locker 88 is still pivoted away from the shaft 32'. As a result, the part 106 passed underneath the thumb 104. Only after the part 106 has passed the thumb 104 the pusher is pushed against the biasing force of the resilient member 96 by the actuator 98. The lip 100 of the pusher 92 will still slide along the sloping surface 102 of the locker 88, causing the locker 88 to pivot towards the shaft 32'. However, the part 106 has already passed the thumb 104 at that moment. In this example, the second capsule 4B pushes the central portion 32 in abutment with the body 94. This is herein defined as the second brewing position. Hence, the second capsule 4B is arranged for moving the central portion 32 from the ready position to the second brewing position. The second capsule 4B is held between the first and second brew chamber parts 18, 20 while brewing, wherein the central portion 32 is in the second brewing position.

Thus, the locking mechanism 86 is arranged for locking the central portion 32 in the first brewing position when the cavity 24 holds the first capsule 4A. It is noted that the locking may be single-sided, viz. the locking mechanism may prevent the central portion 32 from being moved beyond the first brewing position when the cavity 24 holds the first capsule 4A. However movement of the central portion 32 from the first brewing position to the ready position may be not prevented. The locking unit 86 is arranged for selectively preventing the central portion 32 being locked in or near the first brewing position when the second capsule 4B is included in the brew chamber. The locking unit 86 is arranged for selectively allowing the central portion 32 being moved into the second brewing position when the second capsule is included in the brew chamber.

When comparing FIGS. 3A and 4A it will be appreciated that while advancing the first brew chamber part 18 towards the second brew chamber part 20 the first capsule 4A is recessed further into the first brew chamber part than the second capsule 4B. Then the first lid 12A, exit area 13A and/or rim 14A is recessed further into the first brew chamber part 18 than the second lid 12B, exit area 13B and/or rim 14B.

When comparing FIGS. 3B and 4B it will be appreciated that when the brew chamber holds the first capsule 4A, the central portion 32 extends into the cavity 24. The central portion 32 extends into the first brew chamber part 18 beyond a position where the lid 12B, exit area 13B and/or rim 14B of the second capsule 4B would have been, had the second capsule been included in the first brew chamber part 18.

Figure 5A:
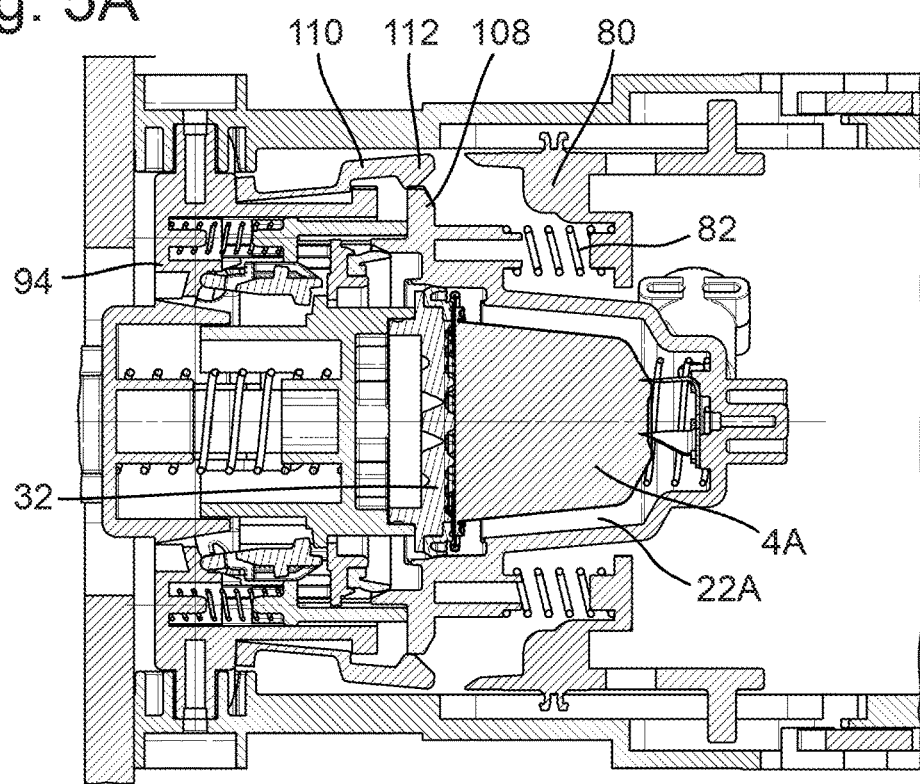
FIGS. 5A-5C show the functioning of the arresting ring of the system as shown in FIG. 1A when the cavity holds the first capsule.
Figure 5B:
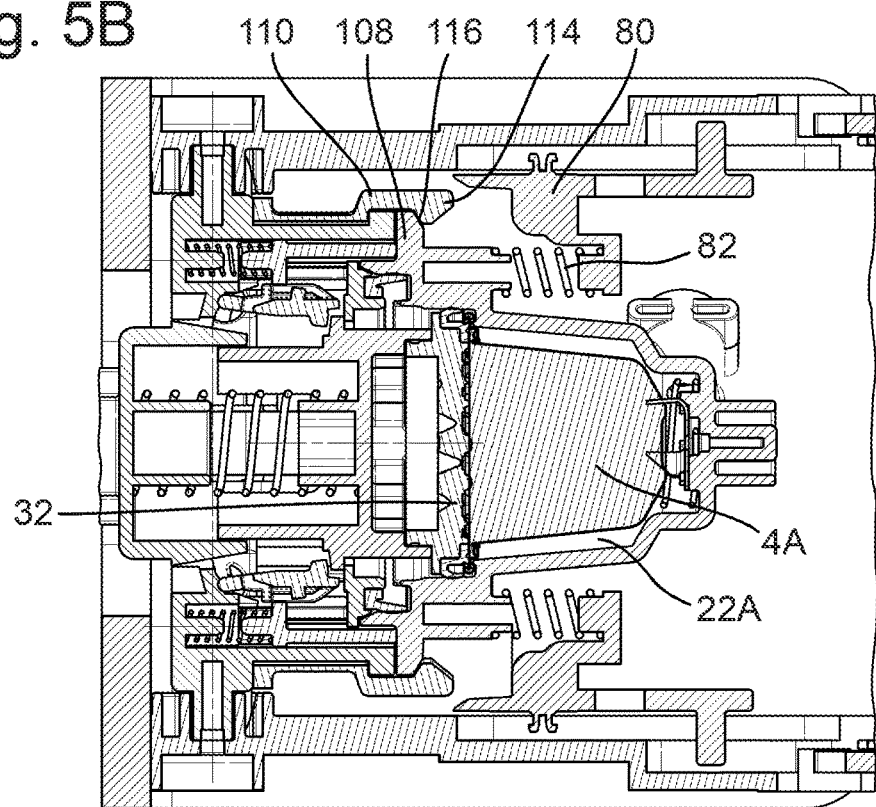
Figure 5C:
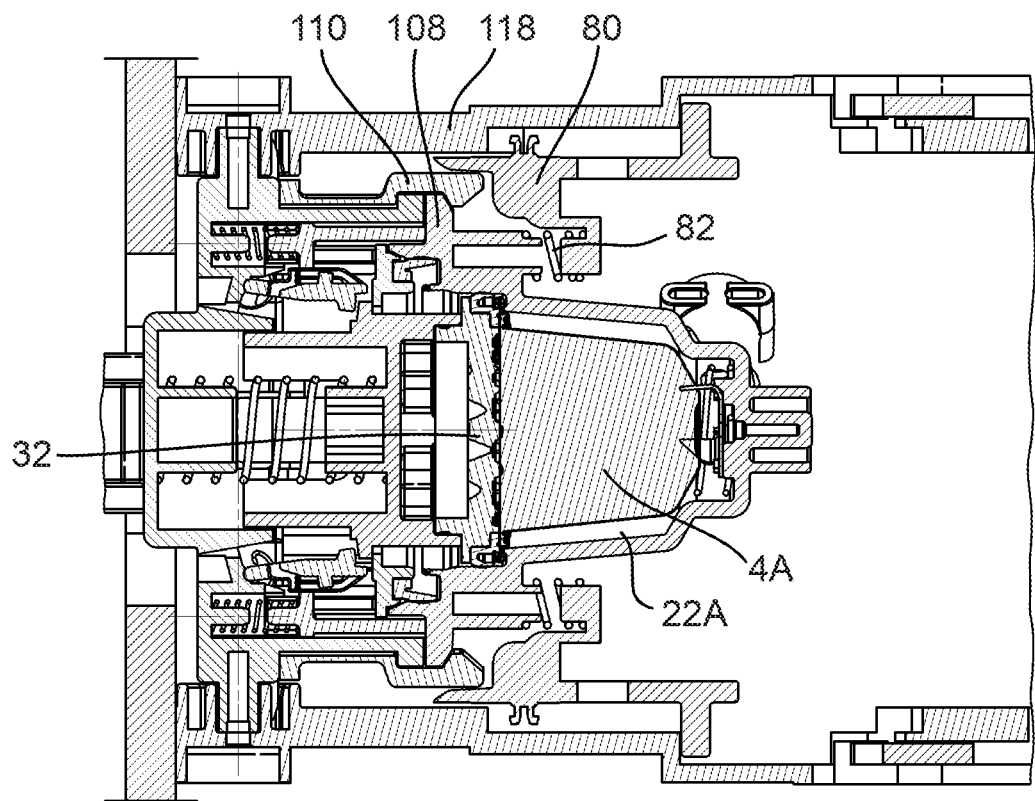

As mentioned above, the knee joint 62 is indirectly connected to the first brew chamber part 18, viz. via the arresting ring 80 and one or more resilient elements 82. FIGS. 5A-5C demonstrate functioning of the arresting ring 80.

In FIG. 5A the first capsule 4A abuts against the central portion 32 with the central portion in the first brewing position. The arresting ring 80 is still in the rearward position. It will be appreciated that the lever 58 will not yet have reached its end position. The first brew chamber part 18 includes a protrusion 108. Here the protrusion 108 is a substantially annular protrusion. The protrusion 108 extends outwardly. Here the protrusion 108 forms an outermost edge of the first brew chamber part 18. The second brew chamber part 20 includes a retainer 110. Here the retainer 110 is designed as a circumferential ring of retainer lips. The retainer 110 is pivotally connected to the body 94. Here the retainer 110 is resiliently pivotally connected to the body 94. The retainer 110 includes a tooth 112. The tooth here has a first inclined surface 114 and a second inclined surface 116.

When lowering the lever 58, the arresting ring 80 will be advanced towards the second brew chamber part 20. The one or more resilient elements 82 will push the first brew chamber part 18 ahead of the arresting ring 80 until the first brew chamber part abuts against the second brew chamber 20 part, e.g. with the capsule 4A, 4B clamped in between. During this movement, the protrusion 108 will advance against the first inclined surface 114. This causes the retainer 110 to be pivoted outwardly (see FIG. 5A). Further advancing causes the protrusion 108 to pass beyond the second inclined surface 116, causing the retainer 110 to pivot inwardly (see FIG. 5B). Further moving and especially lowering of the lever 58, while the first brew chamber part abuts against the second brew chamber 20 part, will cause the one or more resilient elements 82 to be compressed. As a result, the arresting ring 80 will advance towards the second brew chamber part 20. Fully lowering the lever 58 will cause the arresting ring 80 to be interposed between the retainer 110 and a locking ring 118 (see FIG. 5C). The arresting ring 80 surrounding the retainer 110 prevents the retainer 110 from pivoting outwardly. Hence, the first brew chamber part is locked with respect to the second brew chamber part 20. The first brew chamber part is locked onto the second brew chamber part 20.

The apparatus can include a fluid supply system for supplying a fluid, e.g. a liquid, such as hot water under pressure, to the first brew chamber part 18. When the brew chamber is pressurized with the fluid for brewing a beverage, the first and second brew chamber parts 18, 20 will be pushed away from each other by the fluid pressure. The retainer 110 and arresting ring 80, and optionally the locking ring 118, will bear all, or part of, the force exerted by the fluid pressure. The arresting ring 80 interposed between the retainer 110 and the locking ring 118 increases mechanical stability. The arresting ring 80 does not have to bear all forces exerted onto it by the retainer 110, since it can abut against the locking ring 118 and transmit at least part of the forces to the locking ring 118. The locking ring 118 can be immobile, and hence can easily be reinforced. Since the first brew chamber part is locked onto the second brew chamber part 20 the frame 48 and the actuation mechanism, e.g. the knee joint, do not have to bear this force, or at least a smaller part thereof. Hence the frame and/or the actuation mechanism can be designed weaker and/or cheaper.

Figure 6A:
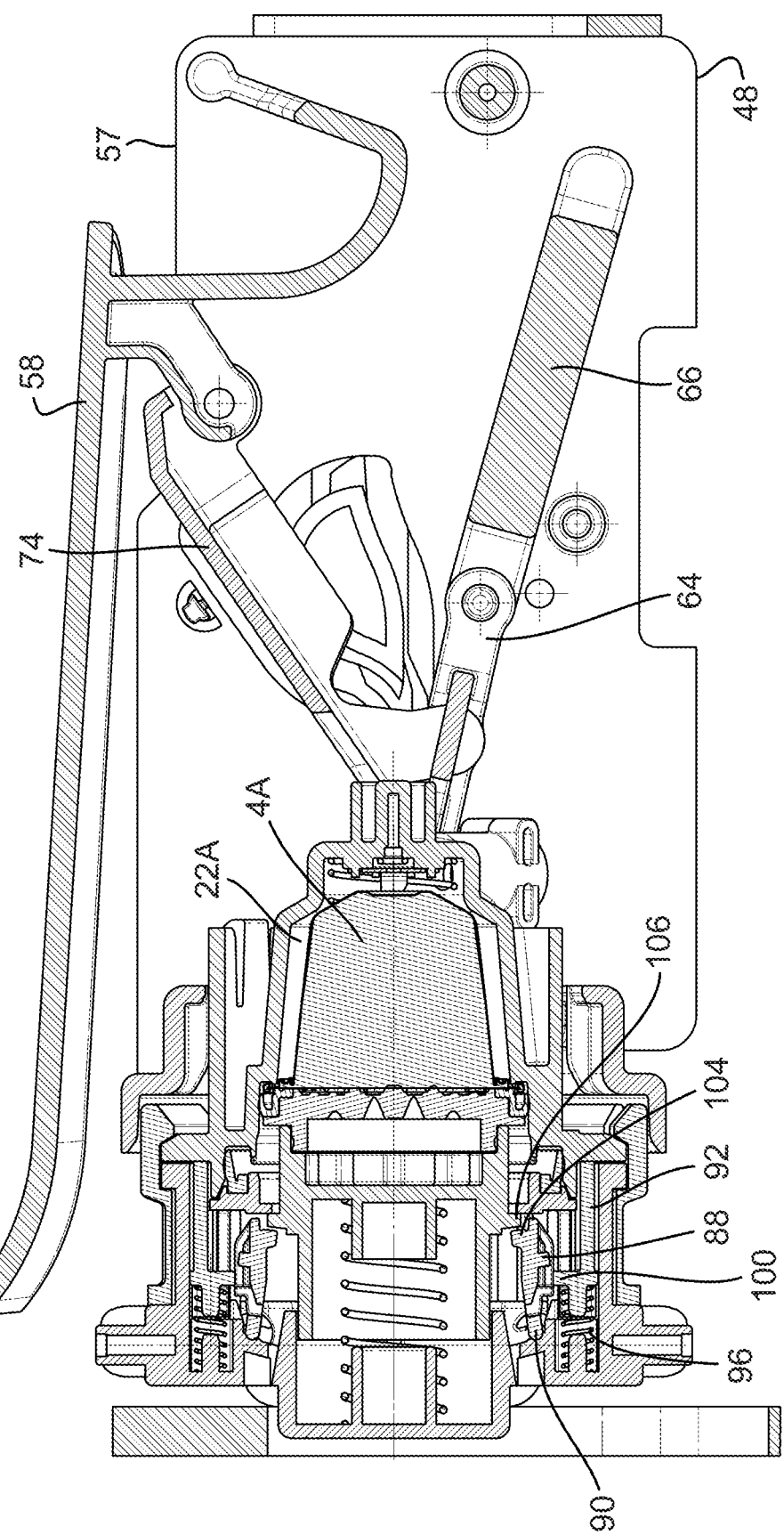

Although the functioning of the arresting ring 80 has been shown in FIGS. 5A-5C with respect to the first capsule 4A, it will be appreciated that the arresting ring 80 can function identically with respect to the second capsule 4B. FIG. 6A shows the first capsule 4A in the brew chamber during extraction. FIG. 6B shows the second capsule 4B in the brew chamber during extraction.

The piercing member 44 is arranged for piercing the bottom 8A, 8B of the capsule 4A, 4B. As can also be seen in FIGS. 5A-5C, in this example the piercing member 44 does not pierce the bottom 8A, 8B until the lid 12A, 12B of the capsule 4A, 4B abuts against the central portion 32 in the first or second brewing position. Thereto, stiffnesses of the resilient element 42 and the resilient member 84 can be chosen. In this example, the stiffness of the resilient element 42 is chosen to be larger than the stiffness of the resilient member 84. However, it will be appreciated that it is also possible that the stiffness of the resilient element 42 is equal to the stiffness of the resilient member 84 or that the stiffness of the resilient element 42 is smaller than the stiffness of the resilient member 84.

Once the capsule 4A, 4B is included in the brew chamber, and the bottom 8A, 8B has been pierced, a fluid, in this example hot water under pressure, can be supplied to the brew chamber. Therefore it is desired that the brew chamber is leak tight. Thereto the central portion 32 is provided with a first sealing member 120. The peripheral portion 34 is provided with a second sealing member 122. The beverage preparation apparatus 2 is arranged for preparing a quantity of a beverage, suitable for consumption, using either a first capsule 4A or a second capsule 4B. The quantity can be a predetermined quantity. The quantity can also be a user selectable, user settable, or user programmable quantity.

Referring to FIG. 3B sealing in view of the first capsule 4A is described. The first sealing member 120 is arranged for providing a fluid sealing engagement between the central portion 32 and the first brew chamber 18 part when forming the brew chamber for holding the first capsule 4A. The first sealing member 120 can be made of any resilient plastic or rubber, for example of silicon, having a hardness in a range of for example 50-70 Shore A. In this example, the first sealing member 120 abuts against the first brew chamber part 18 when the first capsule 4A is included in the brew chamber. This provides a seal for water being present in the cavity 24 outside the capsule 4A. This way, brewing fluid injected into the brew chamber 22A is prevented from bypassing around the outside of the capsule 4A. In the example of FIG. 3B the first sealing member 120 includes a resilient lip 121. The resilient lip 121 is arranged to provide a self-reinforcing sealing engagement between the central portion 32 and the first brew chamber part 18 under the effect of fluid pressure in the brew chamber, which may for example be as high as 5-20 bar. Stiffness of the resilient lip 121 may therefore be higher or lower or the same as the stiffness of the rest of the first sealing member 120. In this example the first sealing member 120 abuts against the rim 14A of the first capsule 4A. The rim 14A is pressed against the first sealing member 120 by the first abutment surface 26. This provides a sealing engagement between the central portion 32 and the capsule 4A against beverage exiting the capsule 4A via the exit area 13A. It will be appreciated that here the side of the rim 14A facing away from the cup-shaped body 6A is sealed against the second brew chamber part 20. In order to reinforce said sealing engagement, the first sealing member 120 may include a small protruding ridge arranged to be received in a corresponding groove on the rim 14A facing away from the cup-shaped body 6A of the first capsule 4A. The small protruding ridge may also be arranged to seal against a flat part on the rim 14A facing away from the cup-shaped body 6A of the first capsule 4A. Alternatively, or additionally, the side of the rim 14A facing towards the cup-shaped body 6A can be sealed against the first brew chamber part 18. Thereto an additional seal can be provided on the first brew chamber part 18, e.g. on the first abutment surface 26, and/or on the capsule 4A, e.g. on the rim 14A or on the cup-shaped body 6A. It will be clear that a seal on the capsule may be additional to the seal between the first brew chamber part 18 and the second brew chamber part 20. This may reduce the sealing effort by the first sealing member 120.

Referring to FIG. 4B sealing in view of the second capsule 4B is described. The second sealing member 122 is arranged for providing a fluid sealing engagement between the peripheral portion 34 and the first brew chamber 18 part when forming the brew chamber for holding the second capsule 4B. The second sealing member 122 can be made of any resilient plastic or rubber, for example of silicon, having a hardness in a range of for example 50-70 Shore A. It will be clear to the person skilled in the art that the features of the second sealing, e.g. size, thickness, stiffness, or others, may, but need not, be the same as for the first sealing member 120. In this example, the second sealing member 122 abuts against the first brew chamber part 18 when the second capsule 4B is included in the brew chamber. This provides a seal for water being present in the cavity 24 outside the capsule 4B. In the example of FIG. 4B the second sealing member 122 includes a resilient lip 123. The resilient lip 123 is arranged to provide a self-reinforcing sealing engagement between the peripheral portion 34 and the first brew chamber part 18 under the effect of fluid pressure in the brew chamber, which may for example be as high as 5-20 bar. Stiffness of the resilient lip 123 may therefore be higher or lower or the same as the stiffness of the rest of the second sealing member 122. Also the features of the resilient lip 123, as for example a length, may, but need not, be the same as for the resilient lip 121 of the first sealing member 120. In this example the second sealing member 122 abuts against the rim 14B of the second capsule 4B. The rim 14B is pressed against the second sealing member 122 by the second abutment surface 28. This may provide a sealing engagement between the peripheral portion 34 and the capsule 4B against beverage exiting the capsule 4B via the exit area 13B. In FIG. 4B the first sealing member 120 provides a sealing engagement between the central portion 32 and the peripheral portion 34 when forming the brew chamber for holding the second capsule 4B. This sealing engagement between the central portion 32 and the peripheral portion 34 can be self-reinforcing. Thereto the engagement between peripheral portion 34 and the second capsule 4B may allow brewing fluid to pass to the first sealing member 120. Hence, the first sealing member 120 provides a sealing engagement between the central portion 32 and the capsule 4B against beverage exiting the capsule 4B via the exit area 13B. In one embodiment, the first sealing member 120 may be in direct sealing contact with a part of the peripheral portion 34 protruding between the first sealing member 120 and the second sealing member 122 when forming the brew chamber for holding the second capsule 4B. In an alternative embodiment, the first sealing member 120 may be in direct sealing contact with the second sealing member 122 included in the peripheral portion 34. It will be appreciated that here the side of the rim 14B facing away from the cup-shaped body 6B, which rim may or may not be covered by a lid, for example by a foil, is sealed against the second brew chamber part 20. Alternatively, or additionally, the side of the rim 14B facing towards the cup-shaped body 6B can be sealed against the first brew chamber part 18. Thereto an additional seal can be provided on the first brew chamber part 18, e.g. on the second abutment surface 28, and/or on the capsule 4B, e.g. on the rim 14B or on the cup-shaped body 6B. It will be clear that a seal on the capsule may be additional to the seal between the first brew chamber part 18 and the second brew chamber part 20. This may reduce the sealing effort by the second sealing member 122.

When the fluid under pressure is supplied to the capsule 4A, 4B in the brew chamber, the exit area 13A, 13B may open against the extraction plate 30. The extraction plate 30 in this example includes a plurality of relief elements 124. Here the relief elements 124 are truncated pyramids. A rise in pressure inside the capsule 4A, 4B can cause the exit area 13A, 13B to tear against the relief elements allowing beverage to exit the capsule 4A, 4B.

The beverage can pass through the extraction plate 30 via apertures in the extraction plate. Next the beverage can flow to an outlet 126. From the outlet 126 the beverage can flow into a receptacle, such as a cup.

Figure 7A:
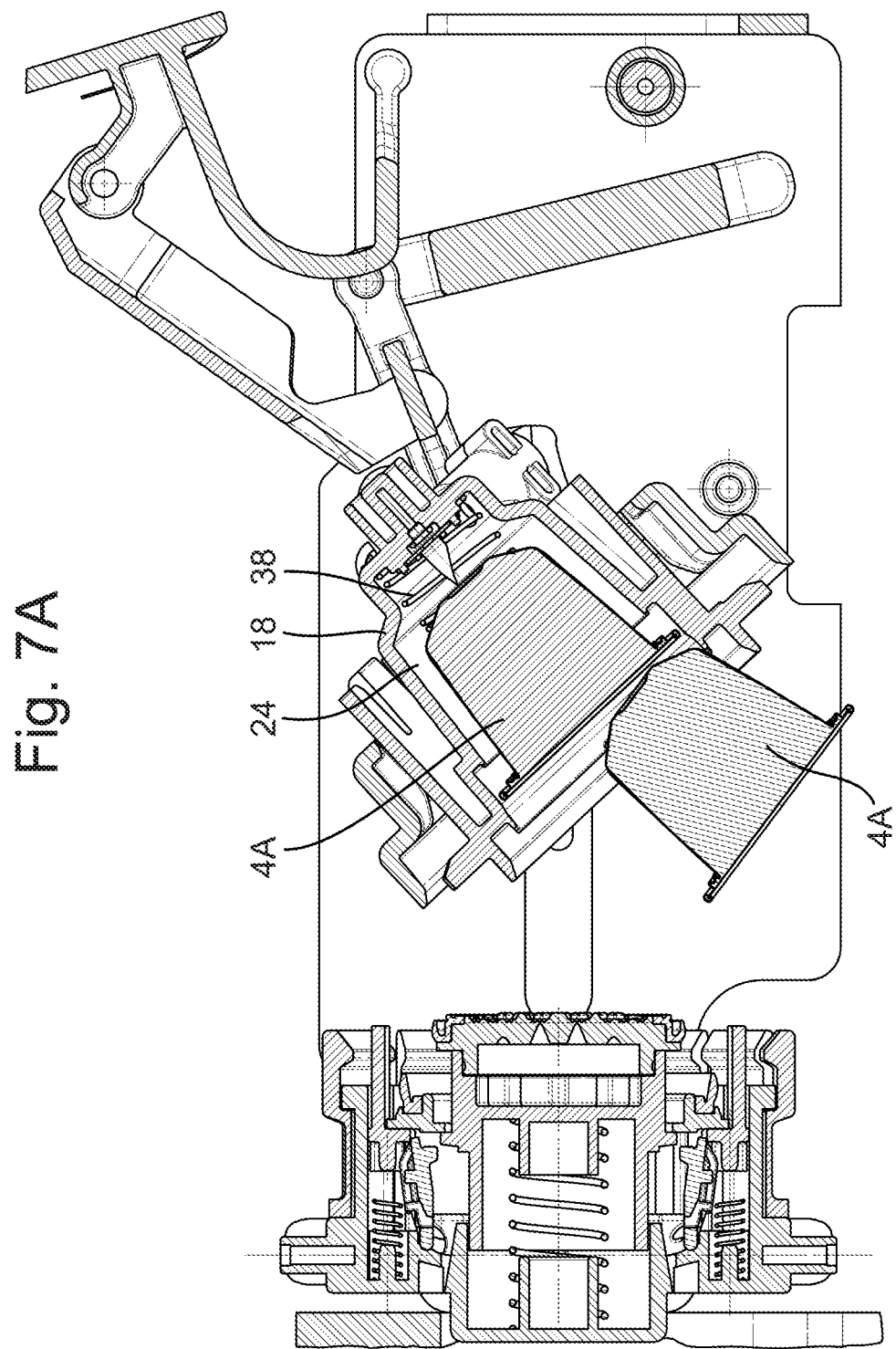

Once the beverage has been brewed, the lever 58 can be moved upwardly. This causes the arresting ring 80 to be moved away from the retainer 110. Next, the first brew chamber part 18 will be moved rearwards. The second inclined surface 116 of the retainer 110 can allow the retainer to pass the projection 108. The first brew chamber 18 part will move away from the second brew chamber part 20. The central portion 32 will return to the ready position. The bosses 50, 52 and grooves 54, 56 determine the path that will be followed by the first brew chamber part 18. As shown in FIGS. 7A and 7B the first brew chamber part will swivel downwardly. This promotes ejection of the used capsule 4A, 4B from the cavity 24 under the effect of gravity. The ejector 38 can assist in pushing the capsule 4A, 4B off the piercing member 44 and out of the cavity 24. The used capsule 4A, 4B can fall into a waste basket of the apparatus 2.

Figure 8A:
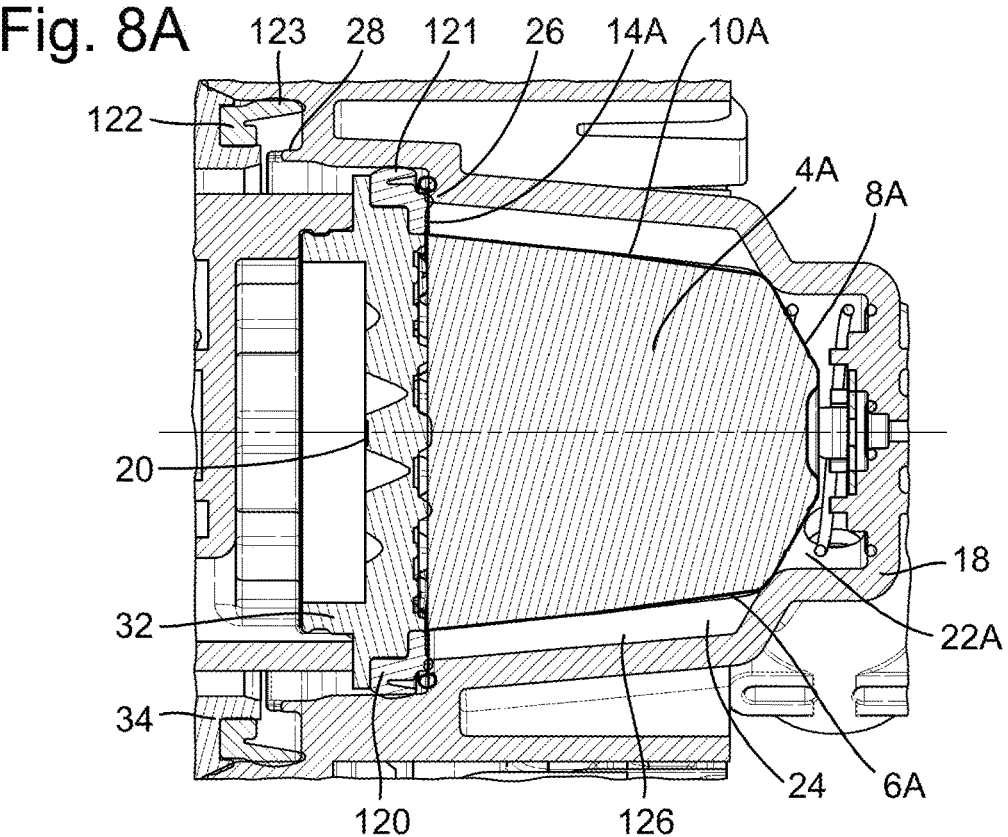
FIGS. 8A-8B show an example of a first capsule and second capsule, respectively, inserted in the brew chamber formed by the first brew chamber part and the second brew chamber part.
Figure 8B:
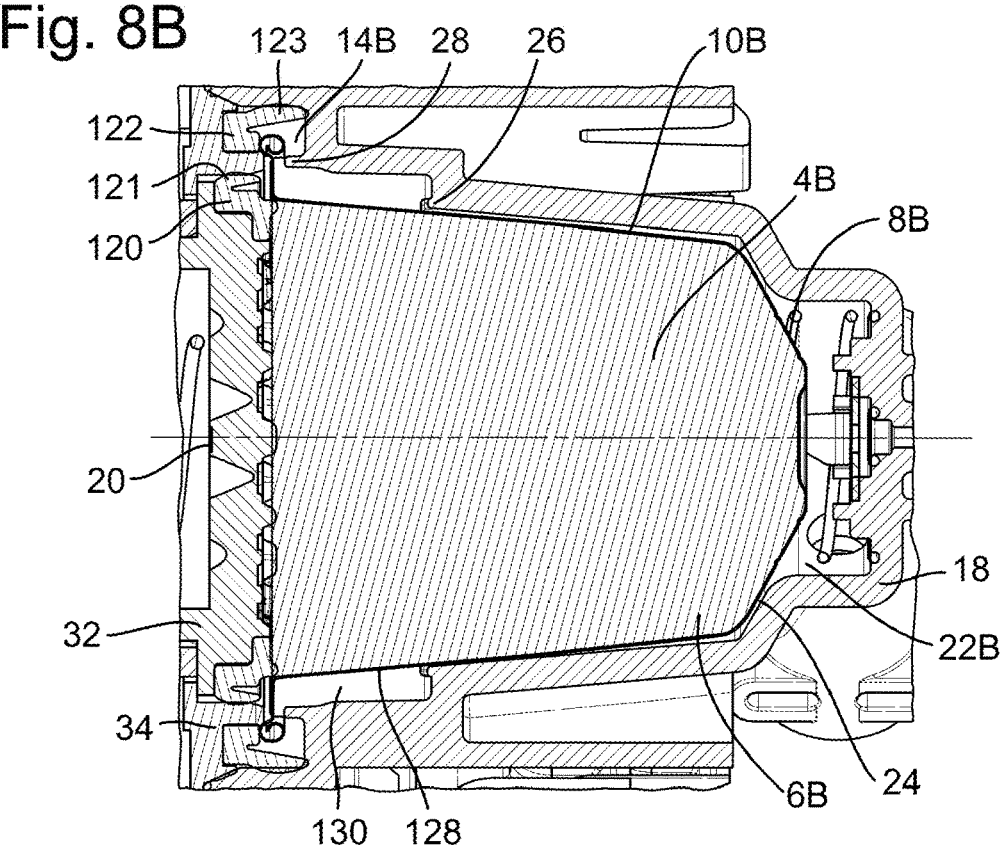

In this example the first and second capsules 4A, 4B are designed to make a similar visual impression. FIG. 8A shows an example of a first capsule 4A inserted in the brew chamber 22A formed by the first brew chamber part 18 and the second brew chamber part 20. It will be appreciated that the circumferential wall 10A is narrower than the cavity 24 at that location. As a result, there is a first volume 126 surrounding the first capsule 4A inside the cavity 24. FIG. 8B shows an example of a second capsule 4B inserted in the brew chamber 22B formed by the first brew chamber part 18 and the second brew chamber part 20. It will be appreciated that a part 128 of the circumferential wall 10B is narrower than the cavity 24 at that location. This part 128 is formed by the part of the circumferential wall 10B extending beyond the first abutment surface 26. As a result, there is a second volume 130 surrounding the second capsule 4B inside the cavity 24.

It is noted that the first volume 126 is not occupied by the first capsule 4A when the brew chamber holds the first capsule 4A. However, this first volume 126 is occupied by part of the second capsule 4B when the brew chamber holds the second capsule 4B. The second volume 130 is not occupied by the second capsule 4B when the brew chamber holds the second capsule 4B. This second volume 130 can receive the central portion 32 of the extraction plate 30 when the brew chamber holds the first capsule 4A.

When brewing a beverage using the first capsule 4A, the first volume 126 will fill with fluid, such as water, which fluid is not used for brewing the beverage. This fluid can be drained to the waste basket after brewing. When brewing a beverage using the second capsule 4B, the second volume 130 will fill with fluid, such as water, which fluid is not used for brewing the beverage. This fluid can be drained to a container, e.g. the waste basket, after brewing. In this example the first volume 126 is substantially equal to the second volume 130. Hence, the volume of fluid directed to the waste basket is substantially equal when brewing a beverage using a first capsule 4A and when brewing a beverage using a second capsule 4B.

Figure 9C:
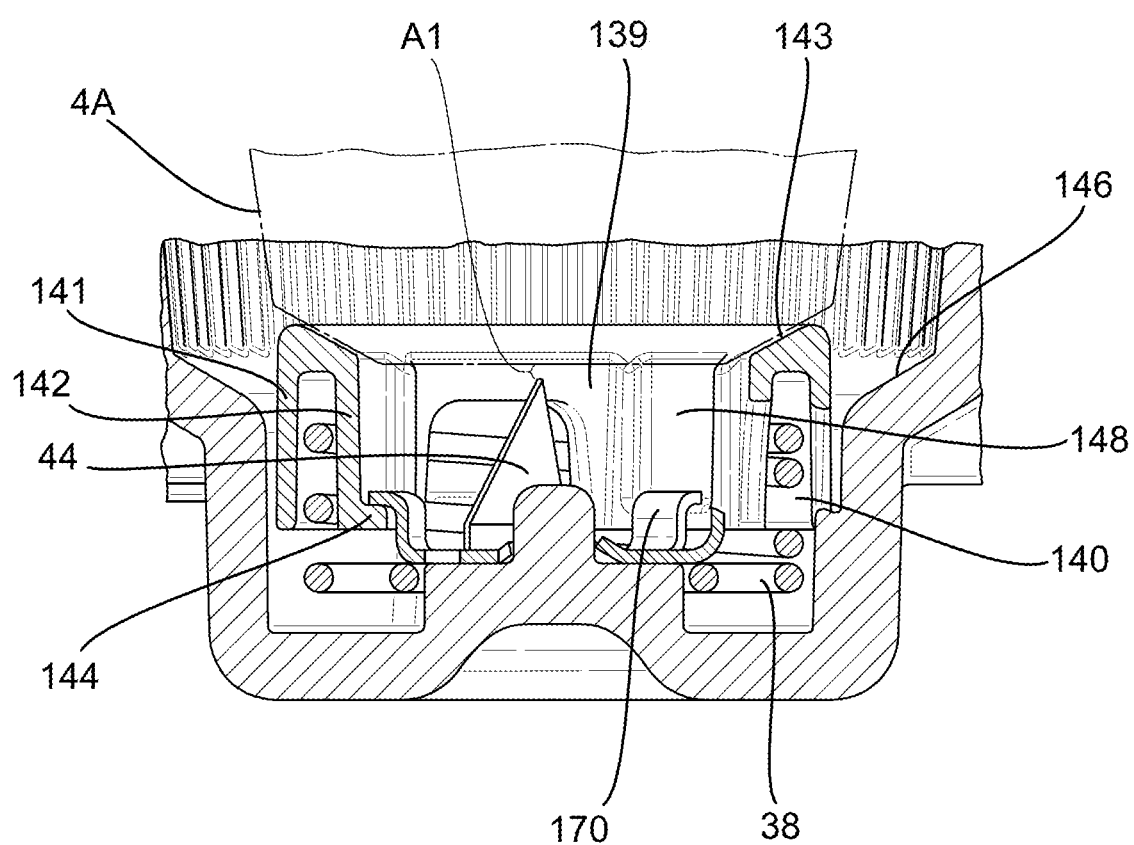

FIGS. 9A-9C show a cross-sectional view, a top view, and a detail of the cross-sectional view, respectively, of a system's first brew chamber part 18 provided with an alignment cap 140. The first brew chamber part 18 comprises a cavity 24 bounded by a chamber inner wall and arranged for holding the first or second capsule 4A, 4B. The first brew chamber part 18 has a first portion 24A extending from the bottom 145 in the direction of the chamber fill opening 160 and a second portion 24B extending from the first portion 24A in the direction of the chamber fill opening 160. The cavity 24 of the first brew chamber part 18 comprises a sudden increase of its diameter at the transition area between the first portion 24A and the second portion 24B of the first brew chamber part 18. In this example, the first brew chamber part 18 has a third portion 24C extending from the second portion 24B in the direction of the chamber fill opening 160. Also between the second and the third portion 24B, 24C, there is a sudden increase in diameter of the first brew chamber part 18. Here, an outer wall side of the first brew chamber part 18 includes an outwardly extending rim 150. The first brew chamber part 18 is further provided with the alignment cap 140 which is movable in an axial direction of the first brew chamber part 18 between a retracted position (see FIG. 11A) and an extended position (see among others FIG. 9A). In the retracted position, the knives 44 extend through an opening 139 of the alignment cap 140. In the retracted position, the alignment cap is positioned distally beyond the tips of the knives 44 as seen from the fill opening 160. In the extended position the alignment cap 140 protrudes proximally beyond the at least one knife 44 as seen from the fill opening 160 of the first brew chamber part 18. In this example, the alignment cap 140 is embodied as a conical ring including a central opening 139 through which the piercing means can extend. In another embodiment, the alignment cap 140 could have a different shape, such that the piercing means 44 could be covered in the extended position of the alignment cap and as seen from the chamber fill opening. In that case, the piercing means could extend through openings e.g. embodied as slits in the retracted position of the alignment cap 140. The first brew chamber part 18 is further provided with a resilient element 38 which applies a force to the alignment cap 140 in the direction from the first position to the second position of the central portion 32 of the extraction plate 30. In the present example, the resilient element 38 is a helical spring. The alignment cap 140 is shaped such as to cover, e.g. extend proximally beyond, the resilient element 38 as seen from the chamber fill opening 160. In the example, the alignment cap 140 includes an external wall 141, as well as an internal wall 142, which walls are connected by a capsule abutment surface 143. The alignment cap 140 has a ring-like structure as seen from the chamber fill opening 160. The external wall 141, the internal wall 142 and the capsule abutment surface 143 form a U-shaped cross-section, as can be seen in FIGS. 9A and 9C. The space between the external wall 141 and the internal wall 142 is configured to at least partly receive the resilient element 38. The open end of the U-shaped cross-section of the alignment cap 140 is directed towards the bottom of the first brew chamber part 18.

The first brew chamber part 18 is further provided with piercing means 44, such as at least one knife 44, or a plurality of knives, for example three knives, extending from the chamber bottom in the direction of the chamber fill opening 160. In this example the piercing means 44 include three knives which are mounted on a mounting plate. The three knives are mounted at a regular interval on a circumference of the mounting plate. Between the knives, retention means 170 are provided, which are arranged to maintain the alignment cap such that the alignment cap 140 cannot be moved further than its extended position towards the chamber fill opening 160, for example when pressure is exerted on the alignment cap 140, for example during brewing. Said retention means 170 can for example be embodied as a plurality of outwardly extending tongues arranged to cooperate with a or more corresponding retainers 144 on the alignment cap 140. In this example, the alignment cap includes grooves 148 for guiding the tongues. The retainers here are positioned at the ends of the grooves 148. In this example knives and retention means are alternatingly mounted on the mounting plate, in particular along a circumference of said mounting plate. Piercing means, retention means and the mounting plate can preferably be a single piece.

Figure 10A:
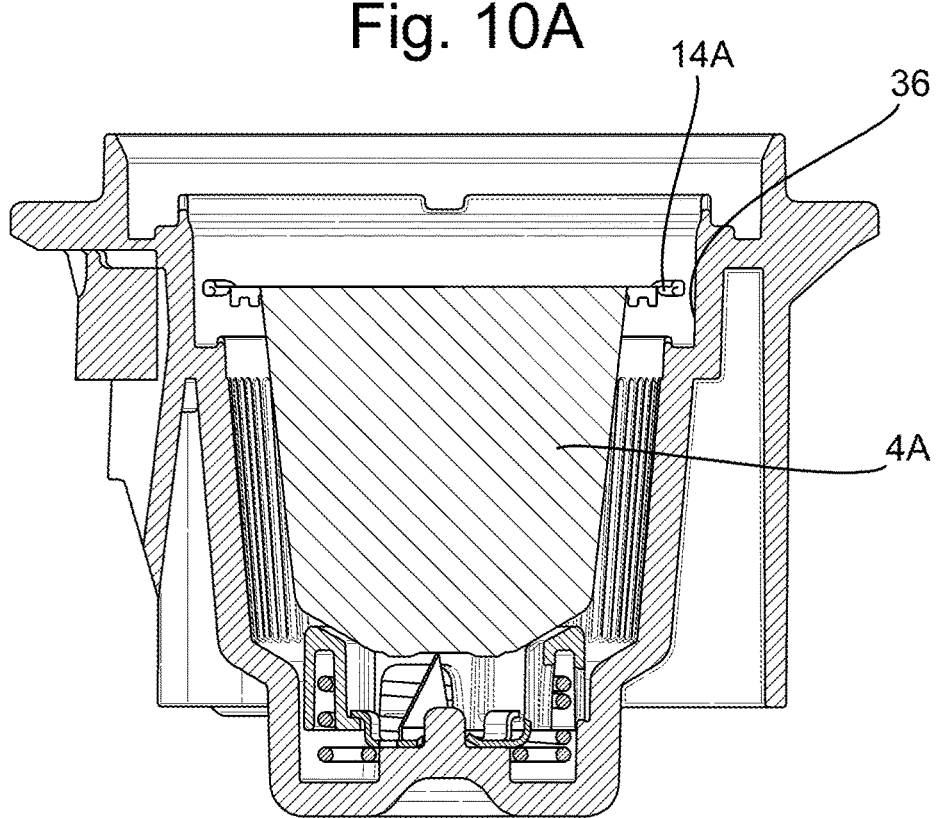
FIGS. 10A-10B show a cross-sectional view of a system's first brew chamber part with a first, respectively second, capsule loaded in the first brew chamber part provided with an alignment cap in an extended position.
Figure 10B:
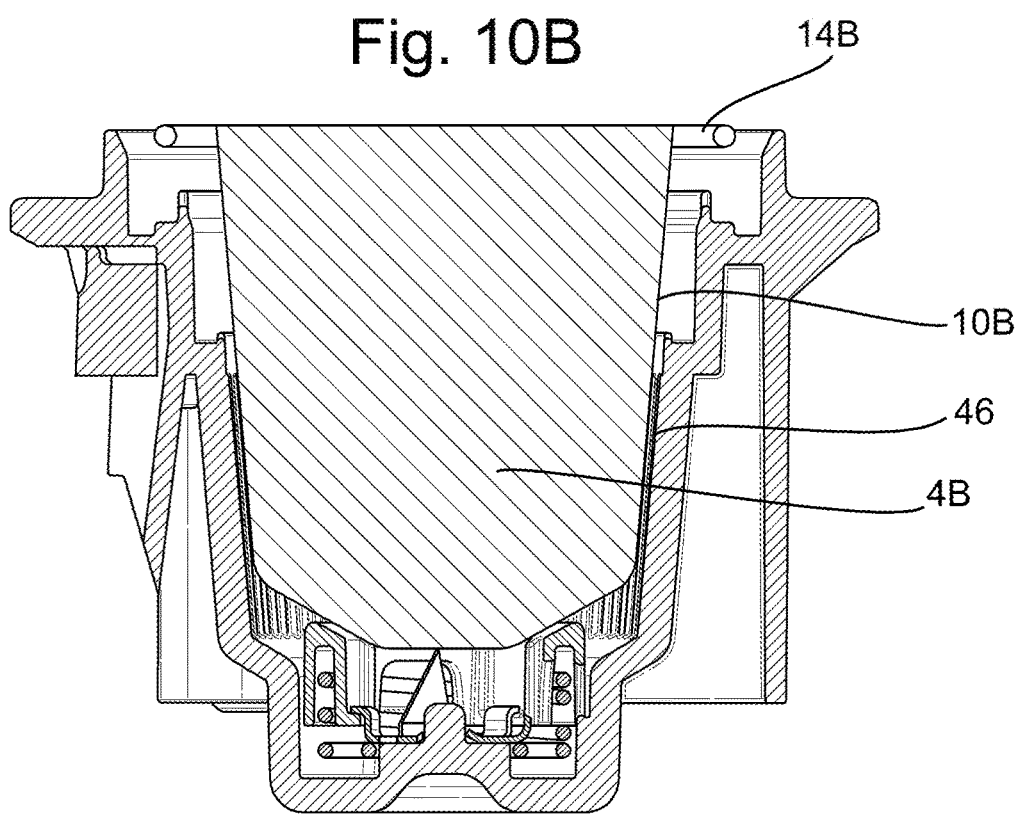

FIGS. 10A-10B show a cross-sectional view of a system's first brew chamber part 18 with a first, respectively second, capsule 4A, 4B loaded in the first brew chamber part 18 provided with an alignment cap 140 in an extended position.

During loading of the first capsule 4A, the rim 14A of the first capsule 4A is guided by an inner surface 36 of the second portion 24B of the first brew chamber part 18. The bottom 8A of the first capsule 4A lowers into the cavity 24 until it abuts against the alignment cap 140. Here the bottom 8A of the first capsule 4A centers on the alignment cap 140. It will be appreciated that the rim 14A of the first capsule 4A is axially positioned between the first abutment surface 26 and the second abutment surface 28. The bottom 8A of the first capsule 4A is not yet pierced in this state.

During loading of the second capsule 4B, the circumferential wall 10B of the second capsule 4B is guided by an inner surface 46 of the first brew chamber part 18. The bottom 8B of the second capsule 4B lowers into the cavity 24 until it abuts against the alignment cap 140. Here the bottom 8B of the second capsule 4B centers on the alignment cap 140. It will be appreciated that the rim 14B of the second capsule 4B is positioned beyond the second abutment surface 28 when seen from the piercing means 44. The bottom 8B of the second capsule 4B is not yet pierced in this state.

The bottoms 8A, 8B of each of the first and second capsule 4A, 4B include a beveled portion of which in this example an inclination corresponds to the capsule abutment surface 143 of the alignment cap 140, such that the first or second capsule 4A, 4B is centralized within the cavity 24 of the first brew chamber part 18, already before the first brew chamber part 18 is closed, or during closing of the first brew chamber part 18 by the second brew chamber part 20, and/or before the at least one knife 44 starts piercing the bottom 8A, 8B of the first or second capsule 4A, 4B.

When comparing FIGS. 10A and 10B with FIG. 9C, it can be seen that here the system is designed such that the second capsule 4B is only starting to be pierced by the at least one knife 44 if the alignment cap 140 is moved A1 mm. In this example, A1 is in the range of approximately 0.5-3 mm, from the extended position, as shown in FIG. 9C, in the direction of the retracted position. In the fully extended position as shown in FIG. 9C, a bottom of a capsule will not touch the at least one knife 44. An outer surface 143 of the alignment cap 140 which faces the fill opening is concave shaped. and the outer surface of the bottom of the first or second capsule is convex shaped. The concave shape of the alignment cap and the convex shape of the capsule's bottom are complementary shapes so that the bottom of the respective first or second capsule 4A, 4B can be at least partially received within the alignment cap 140. FIG. 10B also shows that the second capsule 4B has such a length in an axial direction of the second capsule that if a bottom 8B of the second capsule 4B contacts the alignment cap 140 upon loading while the alignment cap is in the extended position, the second rim 14B is positioned at least partially outside the contour 190 of the first brew chamber part 18. Also can be seen that if the bottom 8B of the second capsule 4B contacts the alignment cap 140 upon loading while the alignment cap is in the extended position, the knives do not pierce the bottom.

Figure 11A:
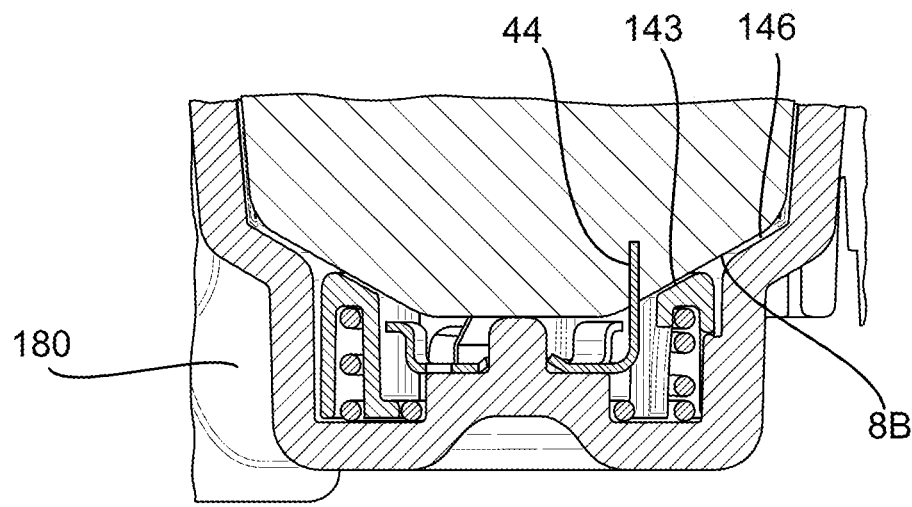
FIGS. 11A-11B show a cross-sectional view of a system's first brew chamber part and of its bottom, with a second capsule loaded in the first brew chamber part provided with an alignment cap in a retracted position.
Figure 11B:
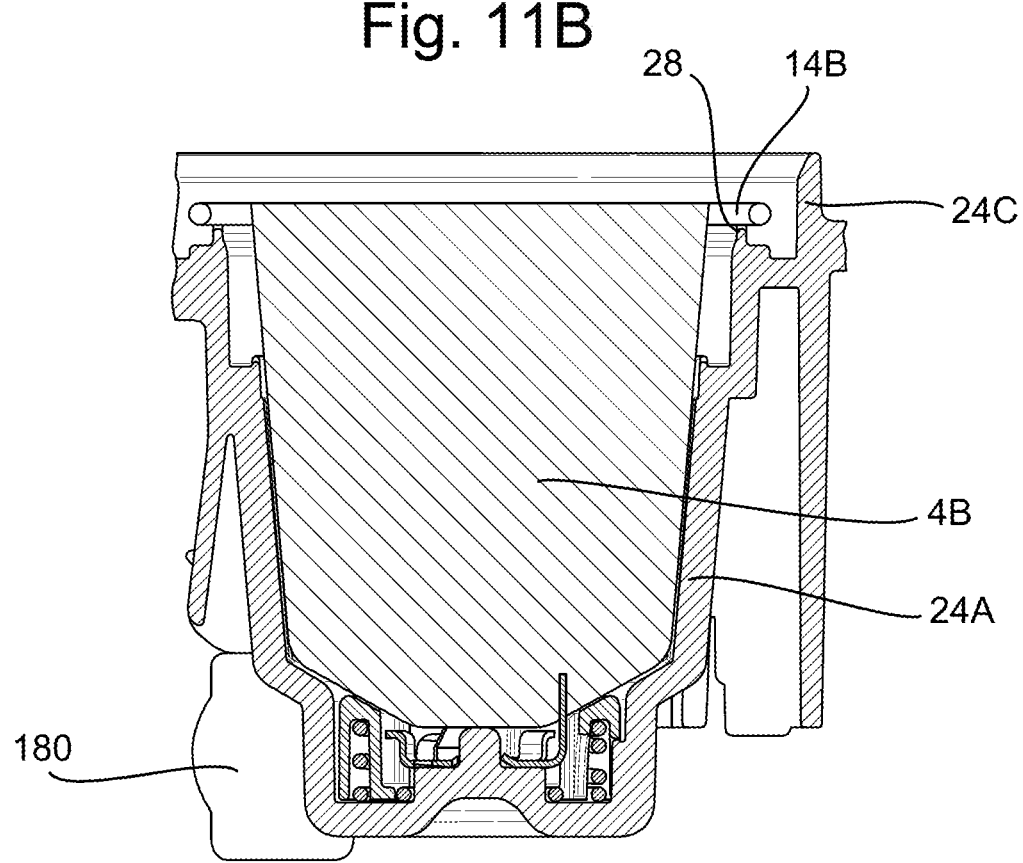

FIGS. 11A-11B show a cross-sectional view of a system's first brew chamber part 18 and of its bottom, with a second capsule loaded in the first brew chamber part 18 provided with an alignment cap 140 in a retracted position. A fluid supply system 180 for supplying a fluid, for example a liquid, such as hot water under pressure, to the first brew chamber part 18, in particular to a bottom of the first brew chamber part 18, is shown here. A portion 146 of the surface of the bottom 145 of the first brew chamber part 18 which faces the fill opening 160, extends radially outwards relative to the alignment cap 140. In the retracted position of the alignment cap, as shown in FIGS. 11A and 11B, a portion of the outer surface of the alignment cap 140 which faces the fill opening 160 of the first brew chamber part 18, in particular the capsule abutment surface 143, and the portion 146 of the surface of the bottom of the first brew chamber part 18 which faces the fill opening 160 and extends radially outwards relative to the alignment cap 140 lay flush and in combination form a combined surface having a concave first shape. The outer surface of the bottom 8B of the second capsule 4B has a convex second shape which is complementary to the first concave first shape. Thus, in the brewing position the bottom 8B of the second capsule 4B fits snugly in a space bounded by the combined surface which has the first shape. A length of the alignment cap 140, and in particular of the external and/or internal surface 141, 142 in an axial direction of the first brew chamber part 18 may be chosen such that when a combined surface is formed in the retracted position of the alignment cap 140, an free end of the external and/or internal surface 141, 142 abuts against the a bottom portion of the first brew chamber part 18. The second capsule 4B has a shape such that if the second capsule is in the brewing position, corresponding to a retracted position of the alignment cap 140, at least a portion of an outer surface of the sidewall of the second capsule lays adjacent to the chamber inner side wall of the first brew chamber part 18 formed by the first portion 24A. If the second capsule 4B is in the brewing position, the second rim 14B is adjacent the chamber inner sidewall of the first brew chamber part 18 formed by the third portion 24C. The second capsule 4B has such a length in an axial direction of the second capsule that if a bottom 8B of the second capsule 4B contacts the alignment cap 140 while the alignment cap 140 is in the retracted position, thus when the bottom 8B is pierced by the at least one knife 44, the second rim 14B is positioned inside the contour of the first brew chamber part 18, contrary to the position of said second rim 14B in a more extended position of the alignment cap 140 as shown in FIG. 10B.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the central portion of the extraction plate includes a plurality of relief elements. The peripheral portion includes no relief elements. However, it will be appreciated that the peripheral portion may also include relief elements. The extraction plate and the second exit area can be adapted to each other such that a flow resistance of the second exit area when opened is less than a flow resistance of the first exit area when opened. The extraction plate and the second exit area may be adapted to each other such that the second exit area tears on the extraction plate over a larger surface area than the first exit area. The extraction plate and the second exit area may be adapted to each other such that the second exit area tears on the extraction plate on more locations than the first exit area. Outer relief elements may be designed for tearing both the first and second exit area wherein the second exit area tears on the outer relief elements over a larger surface area than the first exit area. The extraction plate can include relief elements of a first type and at least one relief element of a second type, wherein the relief elements of the first type are arranged within an area corresponding to the first exit area, and the at least one relief element of the second type being arranged within an area corresponding to the second exit area and outside the area corresponding to the first exit area. The relief element of the second type may have a sharper edge than the relief elements of the first type. The second exit area may include a weakened zone. The weakened zone may be located in a peripheral area of the second exit area.

In the examples, the first and second capsules have substantially the same shape. It is also possible to provide a third capsule having a different shape. The third capsule can e.g. be shaped to substantially fill the brew chamber when the central portion is in the first extraction position. It is also possible to provide a fourth capsule having a different shape. The fourth capsule can e.g. be shaped to substantially fill the brew chamber when the central portion is in the second extraction position.

In the examples, the first capsule has an outwardly extending flange-like rim. It will be appreciated that it is possible that the first capsule does not include an outwardly extending rim. In the examples, the second capsule has an outwardly extending flange-like rim. It will be appreciated that it is possible that the second capsule does not include an outwardly extending rim.

In the examples, the capsule body and lid are made of aluminium foil, preferable polymer coated aluminium foil to allow easy welding of the lid to the body. It will be appreciated that the capsule body and/or lid can be made of a wide variety of materials considered suitable by the skilled person and capable of being processed into a sheet, film or foil using techniques conventionally known in the art such as extrusion, co-extrusion, injection molding, blow molding, vacuum forming, etc. Suitable materials for the capsule body and/or lid include, without being limited thereto, plastic materials, in particular thermoplastic materials, for example a polyolefin polymer, for example polyethylene or polypropylene, PVC, polyesters for example polyethylene terephthalate (PET); metal foils such as aluminum, stainless steel, metal alloys etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

In the examples, the capsules are closed capsules. It is also possible to provide the system with an open capsule. The open capsule is open prior to insertion into the apparatus. The open capsule can be pre-perforated. The open capsule can be packaged in a hermetically sealed package, which has to be removed before inserting the open capsule in the apparatus. In the examples, the capsules are pierced by the piercing means. It is also possible to provide the system with a capsule that is not pierced by the piercing means. Such capsule can e.g. include an entrance filter. In the examples, the capsules open against the extraction plate. It is also possible to provide the system with a capsule that does not open against the extraction plate. Such capsule can e.g. include an exit filter.

In the examples, the capsules themselves do not include a sealing member. It will be appreciated that it is possible to provide the capsule with a sealing member, e.g. a resilient sealing member. The sealing member can e.g. be placed on the rim, e.g. on the side facing towards the cup-shaped body or on the side facing away from the cup-shaped body. Alternatively, or additionally, a sealing member can be provided on the circumferential wall and/or on the bottom.

In the examples the arresting ring and retainer extend along substantially the entire perimeter of the first and second brew chamber parts. This provides particular good locking of the two brew chamber parts onto each other. However, it will be appreciated that it is also possible that the arresting ring and retainer include arresting means and retaining means at one or more discrete positions along the perimeter, e.g. at two, three, four, six or eight positions.

It will be appreciated that it is also possible to provide a first apparatus arranged for brewing a beverage using a first capsule, but incapable of brewing a beverage using a second capsule. Such first apparatus can be included in a system with the apparatus as described in relation to the figures and a first capsule and optionally a second capsule.

It will be appreciated that it is also possible to provide a second apparatus arranged for brewing a beverage using a second capsule, but incapable of brewing a beverage using a first capsule. Such second apparatus can be included in a system with the apparatus as described in relation to the figures and a second capsule and optionally a first capsule.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system for preparing a quantity of beverage suitable for consumption, the system comprising:
    optionally a first exchangeable capsule having a first lid and a first body comprising a first sidewall, a first bottom attached to a first end of the first sidewall and a circumferential outwardly extending first rim attached to a second end of the first sidewall, the first and second end of the first sidewall laying opposite each other wherein the first lid is attached to the first rim for closing a first filling opening of the first body;
    a second exchangeable capsule having a second lid and a second body comprising a second sidewall, a second bottom attached to a first end of the second sidewall and a circumferential outwardly extending second rim attached to a second end of the second sidewall, the first and second ends of the second sidewall laying opposite each other wherein the second lid is attached to the second rim for closing a second filling opening of the second body; and
    an apparatus including a first brew chamber part having a cavity bounded by a chamber inner wall and a chamber bottom of the first brew chamber part wherein the cavity is arranged for selectively holding one of the first and second exchangeable capsules, wherein the first brew chamber part further comprises a chamber fill opening for selectively loading the first or second capsule into the first brew chamber part wherein the chamber bottom and the chamber fill opening lay opposite each other and wherein the first brew chamber part is further provided with at least one knife extending from the chamber bottom in the direction of the chamber fill opening, wherein the apparatus further comprises a second brew chamber part for closing the chamber fill opening of the first brew chamber part wherein the first brew chamber part and the second capsule are adapted to each other such that the second bottom of the second capsule is pierced by the at least one knife if the second capsule is loaded into a brewing position of the second exchangeable capsule in the first brew chamber part and the first brew chamber part is closed by the second brew chamber part,
    wherein the second brew chamber part has an extraction plate for abutting against the first or second lid if the first or second capsule is in its brewing position respectively, the extraction plate including a central portion and a peripheral portion, the central portion being axially movable relative to the peripheral portion from a first position to a second position and vice versa wherein if the first brew chamber part is closed by the second brew chamber part a first distance exists in axial direction of the first brew chamber part between the central portion and the brew chamber bottom if the central portion is in the first position and a second distance exists between the central portion and the brew chamber bottom if the central portion is in the second position wherein the first distance is smaller than the second distance;
    the system further including a mechanism for locking the central portion in the first position when the cavity holds the first exchangeable capsule in its brewing position wherein the central portion lays against the first lid and for pushing the central portion in the second position by means of the second capsule against the force of a spring when the first brew chamber part holds the second exchangeable capsule in its brewing position wherein the central portion lays against the second lid, wherein the first brew chamber part has a first portion extending from the bottom in the direction of the chamber fill opening and a second portion extending from the first portion in the direction of the chamber fill opening, wherein the first portion has a largest inner diameter which is smaller than a smallest inner diameter of the second portion wherein the second capsule is dimensioned such that if the second capsule is located in the first brew chamber part in its brewing position the second rim is distanced in an axial direction of the first brew chamber part from a portion of the chamber inner wall of the first brew chamber part which is formed by the second portion wherein the first brew chamber part is further provided with an alignment cap which is movable in an axial direction of the first brew chamber part between a retracted position wherein the knives extend through an opening of the alignment cap and an extended position wherein the alignment cap protrudes beyond the at least one knife as seen from the fill opening of the first brew chamber part and vice versa, wherein the first brew chamber part is further provided with a resilient element which applies a force to the alignment cap in the direction from the first position to the second position wherein the second capsule and the first brew chamber part are adapted to each other such that the bottom of the second capsule is centralized within the first brew chamber part if the second capsule is loaded in the first brew chamber part.

2. The system according to claim 1, wherein an axial direction of the first brew chamber part is angled relative to a horizontal direction so that the chamber fill opening faces upwardly if the second capsule is being loaded in the first brew chamber part.

3. The system according to claim 1, wherein an axial direction of the first brew chamber part is in a horizontal direction if the second capsule is positioned in the first brew chamber part and the first brew chamber part is being closed by the second brew chamber part to bring the second capsule in the brewing position.

4. The system according to claim 1, wherein the second capsule and the first brew chamber part are adapted to each other such that if the second capsule is loaded in the first brew chamber part, the bottom of the second capsule is further centralized within the first brew chamber part while the first brew chamber part is being closed by the second brew chamber part.

5. The system according to claim 1, wherein the second capsule and the first brew chamber part are adapted to each other such that if the second capsule is loaded in the first brew chamber part, the bottom of the second capsule is further centralized within the first brew chamber part while the first brew chamber part is closed by the second brew chamber part and before the at least one knife starts piercing the bottom of the second capsule.

6. The system according to claim 1, wherein the system is designed such that the second capsule is only starting to be pierced by the at least one knife if the alignment cap is moved A1 mm from the extended position in the direction of the retracted position wherein A1 is in the range of approximately 0.5-3 mm.

7. The system according to claim 1, wherein an outer surface of the alignment cap which faces the fill opening is concave shaped and the outer surface of the bottom of the first or second capsule is convex shaped wherein the concave shape and the convex shape are corresponding shapes so that the bottom of the respective first or second capsule can be at least partially received within the alignment cap.

8. The system according to claim 7, wherein in the retracted position a portion of the outer surface of the alignment cap which faces the fill opening of the first brew chamber part and a portion of the surface of the bottom of the first brew chamber part which faces the fill opening and extends radially outwards relative to the alignment cap lay flush and in combination form a combined surface having a concave first shape wherein the outer surface of the bottom of the second capsule has a convex second shape which is complementary to the concave first shape so that in the brewing position the bottom of the second capsule fits snugly in a space bounded by the combined surface which has the first shape.

9. The system according to claim 1, wherein the first brew chamber part has a third portion extending from the second portion in the direction of the chamber fill opening wherein the second portion has a largest diameter which is smaller than a smallest diameter of the third portion and wherein if the second capsule is in the brewing position the second rim is adjacent the chamber inner sidewall of the first brew chamber part formed by the third portion.

10. The system according to claim 1, wherein the second capsule has such a length in an axial direction of the second capsule that if a bottom of the second capsule contacts the alignment cap upon loading while the alignment cap is in the extended position, the second rim is positioned at least partially outside the contour of the first brew chamber part.

11. The system according to claim 1, wherein the second capsule has such a length in an axial direction of the second capsule that if a bottom of the second capsule contacts the alignment cap while the alignment cap is in the retracted position, the second rim is positioned inside the contour of the first brew chamber part.

12. The system according to claim 1, wherein the second capsule has such a shape that if the second capsule is in the brewing position at least a portion of an outer surface of the sidewall of the second capsule lays adjacent to the chamber inner side wall of the first brew chamber part formed by the first portion.

13. The system according to claim 1, wherein the first capsule is dimensioned such that if the first capsule is located in the first brew chamber part in the brewing position then the first rim is adjacent a portion of the chamber inner side wall of the first brew chamber part which is formed by the second portion of the first brew chamber part.

14. The system according to claim 1, wherein the cavity of the first brew chamber part comprises a sudden increase of its diameter at the transition area between the first portion and the second portion of the first brew chamber part.

15. The system according to claim 1,
wherein an axial direction of the first brew chamber part is angled relative to a horizontal direction so that the chamber fill opening faces upwardly if the second capsule is being loaded in the first brew chamber part;
wherein an axial direction of the first brew chamber part is in a horizontal direction if the second capsule is positioned in the first brew chamber part and the first brew chamber part is being closed by the second brew chamber part to bring the second capsule in the brewing position; and
wherein the second capsule has such a shape that during loading, if the axial direction of the first brew chamber is angled relative to a horizontal direction, the second capsule is first guided downwards into the cavity by a lower part of the chamber side wall formed by the first portion wherein subsequently the bottom of the capsule engages the alignment cap such that the capsule is at least partly centralised within the cavity while the capsule bottom is not pierced by the at least one knife and in that the second capsule has such a shape that during loading if the cavity is subsequently tilted so that the axial direction of the first brew chamber is directed horizontally the capsule is at least further centralised within the cavity while the capsule is further pushed into the first brew chamber part by means of the second brew chamber part upon closing of the first brew chamber part by the second brew chamber part.

16. The system according to claim 1, wherein the mechanism is arranged for preventing the central portion being locked in the first position when the cavity holds the second exchangeable capsule.

17. The system according to claim 1, wherein the mechanism is arranged for allowing the central portion being moved into the second position when the cavity holds the second exchangeable capsule.

18. The system according to claim 1, wherein the system is arranged such that, while closing the first brew chamber part against the second brew chamber part, when the cavity holds the second exchangeable capsule, the central portion is pushed by the second exchangeable capsule in an axial direction of the first brew chamber part in a direction from the first position to the second position and beyond the first position as seen from the at least one knife so that no locking takes place in the first position.

19. The system according to claim 1, wherein the system is arranged such that, while closing the first brew chamber part against the second brew chamber part, when the cavity holds the first exchangeable capsule, the mechanism is actuated by the first brew chamber part before the central portion is pushed beyond the mechanism and especially beyond a locker by the first exchangeable capsule.

20. The system according to claim 1, wherein the central portion includes a first sealing member arranged for providing a fluid sealing engagement between the central portion and the peripheral portion when forming the brew chamber for holding the second exchangeable capsule; and wherein the peripheral portion includes a second sealing member arranged for providing a fluid sealing engagement between the peripheral portion and the first brew chamber part when forming the brew chamber for holding the second exchangeable capsule and wherein the first sealing member is arranged for providing a fluid sealing engagement between the central portion and the second exchangeable capsule when forming the brew chamber for holding the second exchangeable capsule.

* * * * *